(12) United States Patent
Wang et al.

(10) Patent No.: US 11,490,075 B2
(45) Date of Patent: Nov. 1, 2022

(54) BITSTREAM SIGNALING OF ERROR MITIGATION IN SUB-PICTURE BITSTREAM BASED VIEWPORT DEPENDENT VIDEO CODING

(71) Applicant: HUAWEI TECHNOLOGIES CO., LTD., Shenzhen (CN)

(72) Inventors: Ye-Kui Wang, San Diego, CA (US); Huameng Fang, Shenzhen (CN); Yuqun Fan, Shenzhen (CN); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/061,416

(22) Filed: Oct. 1, 2020

(65) Prior Publication Data

US 2021/0021814 A1 Jan. 21, 2021

Related U.S. Application Data

(63) Continuation of application No. PCT/US2019/024126, filed on Mar. 26, 2019.
(Continued)

(51) Int. Cl.
*H04N 19/105* (2014.01)
*H04N 19/13* (2014.01)
(Continued)

(52) U.S. Cl.
CPC ............ *H04N 19/105* (2014.11); *G06T 9/00* (2013.01); *G06T 19/006* (2013.01); *H04N 19/13* (2014.11);
(Continued)

(58) Field of Classification Search
USPC .................................................... 375/240.02
See application file for complete search history.

(56) References Cited

U.S. PATENT DOCUMENTS

| | | | |
|---|---|---|---|
| 2007/0086664 A1* | 4/2007 | Kim .................. | H04N 21/4131 382/239 |
| 2012/0023250 A1* | 1/2012 | Chen ................ | H04N 21/23608 709/231 |

(Continued)

OTHER PUBLICATIONS

Skupin, R., et al., "Temporal MCTS Coding Constraints Implementation," JCTVC-AC0038, 29th Meeting: Macao, CN, Oct. 19-25, 2017, 2 pages.
(Continued)

*Primary Examiner* — Patricia I Young
(74) *Attorney, Agent, or Firm* — Conley Rose, P.C.

(57) ABSTRACT

A video coding mechanism for viewpoint dependent video coding is disclosed. The mechanism includes mapping a spherical video sequence into a plurality of sub-picture video sequences. The mechanism further includes encoding the plurality of sub-picture video sequences as sub-picture bitstreams to support merging of the plurality of sub-picture bitstreams, the encoding ensuring that each sub-picture bitstream is self-referenced and two or more of the sub-picture bitstreams can be merged to generate a single video bitstream using a lightweight bitstream rewriting process that does not involve changing of any block-level coding results. A mergable indication is encoded to indicate that the sub-picture bitstream containing the indication is compatible with a multi-bitstream merge function for reconstruction of the spherical video sequence. A set of the sub-picture bitstreams and the mergable indication are transmitted toward the decoder to support decoding and displaying a virtual reality video viewport.

18 Claims, 13 Drawing Sheets

Related U.S. Application Data

(60) Provisional application No. 62/651,821, filed on Apr. 3, 2018.

(51) Int. Cl.

| | | |
|---|---|---|
| *H04N 19/132* | (2014.01) | |
| *H04N 19/139* | (2014.01) | |
| *H04N 19/159* | (2014.01) | |
| *H04N 19/167* | (2014.01) | |
| *H04N 19/172* | (2014.01) | |
| *H04N 19/436* | (2014.01) | |
| *H04N 19/44* | (2014.01) | |
| *H04N 19/46* | (2014.01) | |
| *H04N 19/597* | (2014.01) | |
| *H04N 19/70* | (2014.01) | |
| *G06T 9/00* | (2006.01) | |
| *H04N 19/176* | (2014.01) | |
| *G06T 19/00* | (2011.01) | |

(52) U.S. Cl.
CPC ......... *H04N 19/132* (2014.11); *H04N 19/139* (2014.11); *H04N 19/159* (2014.11); *H04N 19/167* (2014.11); *H04N 19/172* (2014.11); *H04N 19/176* (2014.11); *H04N 19/436* (2014.11); *H04N 19/44* (2014.11); *H04N 19/46* (2014.11); *H04N 19/597* (2014.11); *H04N 19/70* (2014.11)

(56) References Cited

U.S. PATENT DOCUMENTS

| | | | | |
|---|---|---|---|---|
| 2014/0003504 | A1* | 1/2014 | Ugur | H04N 19/167 |
| | | | | 375/240.12 |
| 2014/0086333 | A1 | 3/2014 | Wang | |
| 2014/0301464 | A1* | 10/2014 | Wu | H04N 19/436 |
| | | | | 375/240.15 |
| 2015/0016503 | A1* | 1/2015 | Rapaka | H04N 19/436 |
| | | | | 375/240.02 |
| 2015/0350659 | A1* | 12/2015 | Auyeung | H04N 19/115 |
| | | | | 375/240.26 |
| 2016/0381385 | A1* | 12/2016 | Ugur | H04N 19/117 |
| | | | | 375/240.12 |
| 2017/0344843 | A1 | 11/2017 | Wang et al. | |
| 2018/0176468 | A1 | 6/2018 | Wang et al. | |
| 2018/0270287 | A1 | 9/2018 | Ouedraogo et al. | |
| 2018/0276890 | A1* | 9/2018 | Wang | G06T 19/003 |
| 2018/0277164 | A1* | 9/2018 | Wang | H04N 21/816 |
| 2019/0174161 | A1* | 6/2019 | Skupin | H04L 65/601 |
| 2020/0053392 | A1* | 2/2020 | Hannuksela | H04N 19/31 |
| 2021/0227231 | A1 | 7/2021 | Hannuksela et al. | |

OTHER PUBLICATIONS

"3rd Generation Partnership Project; Technical Specification Group Services and System Aspects; Transparent end-to-end packet switched streaming service (PSS); 3GPP file format (3GP); (Release 16)," 3GPP TS 26.244 V16.1.0, Sep. 2020, 68 pages.

"Line Transmission of Non-Telephone Signals Video Codec for Audiovisual Services at p x 64 kbits," ITU-T Recommendation H.261, Mar. 1993, 29 pages.

"Transmission of Non-Telephone Signals; Information Technology—Generic Coding of Moving Pictures and Associated Audio Information: Video," ITU-T Recommendation H.262, Jul. 1995, 211 pages.

"Series H: Audiovisual and Multimedia Systems; Infrastructure of audiovisual services—Coding of moving video; Video coding for low bit rate communication," ITU-T Recommendation H.263, Jan. 2005, 226 pages.

"Series H: Audiovisual and Multimedia Systems; Infrastructure of audiovisual services—Coding of moving video; Advanced video coding for generic audiovisual services," Recommendation ITU-T H.264, Jun. 2019, 836 pages.

"Series H: Audiovisual and Multimedia Systems; Infrastructure of audiovisual services—Coding of moving video; High efficiency video coding" Recommendation ITU-T H.265, Apr. 2013, 317 pages.

"Information technology—Coding of audio-visual objects—Part 12: ISO base media file format" ISO/IEC 14496-12, Fifth Edition, Dec. 15, 2015, 248 pages.

"Information technology—Coding of audio-visual objects—Part 14: MP4 file format," ISO/IEC 14496-14, Second Edition, Nov. 2018, 22 pages.

"Information technology—Coding of audio-visual objects—Part 15: Advanced Video Coding (AVC) file format," ISO/IEC 14496-15, First Edition, Apr. 15, 2004, 29 pages.

"Information Technology—High efficiency coding and media delivery in heterogeneous environments—Part 2: High efficiency video coding," ISO/IEC 23008-2, Fourth Edition Aug. 2020, 11 pages.

Information Technology—Coded representation of immersive media—Part 2": Omnidirectional media format," ISO/IEC FDIS 23090-2, 2021, 15 pages.

JCTVC-AC1005-v2, "HEVC Additional Supplemental Enhancement Information (Draft 4)," Joint Collaborative Team on Video Coding (JCT-VC) of ITU-T SG 16 WP 3 and ISO/IEC JTC 1/SC 29/WG 11, 29th Meeting: Macao, CN, Oct. 19-25, 2017, 56 pages.

Nokia, "[OMAF] Defects and proposed fixes," ISO/IEC JTC1/SC29/WG11 MPEG2018/M42066, Jan. 2018, 4 pages.

Nokia, "[OMAF] On sub-picture compositions," ISO/IEC JTC1/SC29/WG11 MPEG2018/M42085, Jan. 2018, 3 pages.

Huawei Technologies, Co Ltd., "[OMAF] Constraints on sub-picture tracks and sub-picture bitstreams," ISO/IEC JTC1/SC29/WG11 MPEG2018/M42458, Apr. 2018, 4 pages.

Systems Subgroup, "Technology under Consideration on sub-picture composition track grouping for OMAF," ISO/IEC JTC1/SC29/WG11 MPEG2017/N17279, Oct. 2017, 7 pages.

\* cited by examiner

BITSTREAM SIGNALING OF ERROR MITIGATION IN SUB-PICTURE BITSTREAM BASED VIEWPORT DEPENDENT VIDEO CODING

CROSS-REFERENCE TO RELATED APPLICATIONS

This application is a continuation of International Application No. PCT/US2019/024126 filed on Mar. 26, 2019, by Futurewei Technologies, Inc., and titled "Bitstream Signaling of Error Mitigation in Sub-Picture Bitstream Based Viewport Dependent Video Coding," which claims the benefit of U.S. Provisional Patent Application No. 62/651,821, filed Apr. 3, 2018 by Ye-Kui Wang, et. al., and titled "Constraints For Lightweight Rewriting Of Multiple Sub-Picture Video Bitstreams Into One Video Bitstream," which is hereby incorporated by reference.

TECHNICAL FIELD

The present disclosure is generally related to video coding for Virtual Reality (VR), and is specifically related to signaling of error prevention mechanisms when coding a VR picture bitstream as a plurality of sub-picture bitstreams to support viewport dependent video coding.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in a video coding device. The method comprises mapping, by the processor, a spherical video sequence, stitched from multiple directional video sequences, into a plurality of sub-picture video sequences each containing a sequence of sub-pictures. The method also comprises encoding, by the processor, the plurality of sub-picture video sequences as sub-picture bitstreams to support merging of the plurality of sub-picture bitstreams, the encoding ensuring that each sub-picture bitstream is self-referenced and two or more of the sub-picture bitstreams can be merged to generate a single video bitstream using a lightweight bitstream rewriting process that does not involve changing of any block-level coding results. The method also comprises encoding, by the processor, a mergable indication within at least one of the sub-picture bitstreams, the mergable indication indicating that the sub-picture bitstream containing the indication is compatible with a multi-bitstream merge function for reconstruction of the spherical video sequence or a part thereof. The method also comprises transmitting, by a transmitter of the video coding device, a set of the plurality of sub-picture bitstreams and the mergable indication toward the decoder to support decoding and displaying a virtual reality video viewport. A stream of virtual reality (VR) images can be split into multiple sub-picture streams for selective transmission to the user. The sub-picture streams can be constrained during inter-prediction to be completely self-referencing and temporally synchronized in order to prevent decoding errors when some streams are omitted or sent at different resolutions. This allows the streams to merged by a lightweight merging process at the decoder. The present embodiment uses bitstream level signaling to indicate to the decoder that the various sub-picture bitstream tracks are compatible with the lightweight merging process. Accordingly, the lightweight merging process can merge the sub-picture bitstreams at the decoder by using header information and without needing to alter block level coding results to account for inter-prediction related artifacts occurring due to motion vectors crossing sub-picture stream boundaries.

Optionally, in any of the preceding aspects, another implementation of the aspect provides, wherein the mergable indication is included in a supplemental enhancement information (SEI) message.

Optionally, in any of the preceding aspects, another implementation of the aspect provides, wherein the mergable indication is included in a temporal motion constrained tile set (MCTS) SEI message, wherein the temporal MCTS SEI message is used despite inclusion of a single tile in a picture of the spherical video sequence, and wherein the single tile is an MCTS.

Optionally, in any of the preceding aspects, another implementation of the aspect provides, wherein the temporal MCTS SEI message has an each_tile_one_tile_set_flag set equal to 1.

Optionally, in any of the preceding aspects, another implementation of the aspect provides, wherein the SEI message is a lightweight merging indication SEI message.

Optionally, in any of the preceding aspects, another implementation of the aspect provides, wherein the SEI message further indicates that waveform parallel processing is disabled by setting an entropy_coding_sync_enabled_flag to zero in picture parameter sets (PPSs) for each sub-picture bitstream.

Optionally, in any of the preceding aspects, another implementation of the aspect provides, wherein the mergable indication is a syntax element contained as video usability information (VUI) in a sequence parameter set (SPS).

Optionally, in any of the preceding aspects, another implementation of the aspect provides, wherein the mergable indication is a syntax element contained as VUI in a video parameter set (VPS).

Optionally, in any of the preceding aspects, another implementation of the aspect provides, wherein the mergable indication is included between a set of general profile compatibility flags and a general level identification code in a profile tier level syntax structure.

In an embodiment, the disclosure includes a non-transitory computer readable medium comprising a computer program product for use by a video coding device, the computer program product comprising computer executable instructions stored on the non-transitory computer readable medium such that when executed by a processor cause the video coding device to perform the method of any of abovementioned aspects.

In an embodiment, the disclosure includes a video coding device comprising a processor configured to map a spherical video sequence, stitched from multiple directional video sequences, into a plurality of sub-picture video sequences each containing sub-pictures. The processor is further configured to encode the plurality of sub-picture video sequences as sub-picture bitstreams to support merging of the plurality of sub-picture bitstreams, the encoding ensuring that each sub-picture bitstream is self-referenced and two or more of the sub-picture bitstreams can be merged to generate a single video bitstream using a lightweight bitstream rewriting process that does not involve changing of any block-level coding results. The processor is further configured to encode a mergable indication within at least one of the sub-picture bitstreams, the mergable indication indicating that the sub-picture bitstream containing the indication is compatible with a multi-bitstream merge function for reconstruction of the spherical video sequence or a part thereof. The video coding device also comprises a transmitter coupled to the processer, the transmitter configured to transmit a set of the sub-picture bitstreams and the mergable indication toward the decoder to support decoding and displaying a virtual reality video viewport. A stream of VR images can be split into multiple sub-picture streams for selective transmission to the user. The sub-picture streams can be constrained during inter-prediction to be completely self-referencing and temporally synchronized in order to prevent decoding errors when some streams are omitted or sent at different resolutions. This allows the streams to merged by a lightweight merging process at the decoder. The present embodiment uses bitstream level signaling to indicate to the decoder that the various sub-picture bitstream tracks are compatible with the lightweight merging process. Accordingly, the lightweight merging process can merge the sub-picture bitstreams at the decoder by using header information and without needing to alter block level coding results to account for inter-prediction related artifacts occurring due to motion vectors crossing sub-picture stream boundaries.

Optionally, in any of the preceding aspects, another implementation of the aspect provides, wherein the mergable indication is included in a SEI message.

Optionally, in any of the preceding aspects, another implementation of the aspect provides, wherein the mergable indication is included in a temporal MCTS SEI message, wherein the temporal MCTS SEI message is used despite inclusion of a single tile in a picture of the spherical video sequence, and wherein the single tile is an MCTS.

Optionally, in any of the preceding aspects, another implementation of the aspect provides, wherein the temporal MCTS SEI message has an each_tile_one_tile_set_flag set equal to 1.

Optionally, in any of the preceding aspects, another implementation of the aspect provides, wherein the SEI message is a lightweight merging indication SEI message.

Optionally, in any of the preceding aspects, another implementation of the aspect provides, wherein the SEI message further indicates that waveform parallel processing is disabled by setting an entropy_coding_sync_enabled_flag to zero in PPS for each sub-picture bitstream.

Optionally, in any of the preceding aspects, another implementation of the aspect provides, wherein the mergable indication is a syntax element contained as VUI in a SPS.

Optionally, in any of the preceding aspects, another implementation of the aspect provides, wherein the mergable indication is a syntax element contained as VUI in a VPS.

Optionally, in any of the preceding aspects, another implementation of the aspect provides, wherein the mergable indication is included between a set of general profile compatibility flags and a general level identification code flag in a profile tier level syntax structure.

In an embodiment, the disclosure includes a video coding device comprising a mapping means for mapping a spherical video sequence, stitched from multiple directional video sequences, into a plurality of sub-picture video sequences each containing a sequence of sub-pictures. The video coding device also comprises a video stream encoding means for encoding the plurality of sub-picture video sequences as sub-picture bitstreams to support merging of the plurality of sub-picture bitstreams, the encoding including ensuring that each sub-picture bitstream is self-referenced and two or more of the sub-picture bitstreams can be merged to generate a single video bitstream using a lightweight bitstream rewriting process that does not involve changing of any block-level coding results. The video coding device also comprises a mergable indication means for encoding a mergable indication within at least one of the sub-picture bitstreams, the mergable indication indicating that the sub-picture bitstream containing the indication is compatible with a multi-bitstream merge function for reconstruction of the spherical video sequence or a part thereof. The video coding device also comprises a transmitting means for transmitting a set of the sub-picture bitstreams and the mergable indication toward the decoder to support decoding and displaying a virtual reality video viewport. A stream of VR images can be split into multiple sub-picture streams for selective transmission to the user. The sub-picture streams can be constrained during inter-prediction to be completely self-referencing and temporally synchronized in order to prevent decoding errors when some streams are omitted or sent at different resolutions. This allows the streams to merged by a lightweight merging process at the decoder. The present embodiment uses bitstream level signaling to indicate to the decoder that the various sub-picture bitstream tracks are compatible with the lightweight merging process. Accordingly, the lightweight merging process can merge the sub-picture bitstreams at the decoder by using header information and without needing to alter block level coding results to account for inter-prediction related artifacts occurring due to motion vectors crossing sub-picture stream boundaries.

Optionally, in any of the preceding aspects, another implementation of the aspect provides, wherein the mergable indication is included in a SEI message.

Optionally, in any of the preceding aspects, another implementation of the aspect provides, wherein the mergable indication is included in a temporal MCTS SEI message, wherein the temporal MCTS SEI message is used despite inclusion of a single tile in a picture of the spherical video sequence, and wherein the single tile is an MCTS.

Optionally, in any of the preceding aspects, another implementation of the aspect provides, wherein the temporal MCTS SEI message has an each_tile_one_tile_set_flag set equal to 1.

Optionally, in any of the preceding aspects, another implementation of the aspect provides, wherein the SEI message is a lightweight merging indication SEI message.

Optionally, in any of the preceding aspects, another implementation of the aspect provides, wherein the SEI message further indicates that waveform parallel processing is disabled by setting an entropy_coding_sync_enabled_flag to zero in picture parameter sets (PPS) for each sub-picture bitstream.

Optionally, in any of the preceding aspects, another implementation of the aspect provides, wherein the mergable indication is a syntax element contained as VUI in a SPS.

Optionally, in any of the preceding aspects, another implementation of the aspect provides, wherein the mergable indication is a syntax element contained as VUI in a VPS.

Optionally, in any of the preceding aspects, another implementation of the aspect provides, wherein the mergable indication is included between a set of general profile compatibility flags and a general level identification code flag in a profile tier level syntax structure.

In an embodiment, the disclosure includes a method comprising employing a temporal motion-constrained tile set SEI message for a picture. The method also comprises setting a tiles_enabled_flag to zero for an active PPS to indicate the picture contains only one tile. The method also comprises setting a value of each_tile_one_tile_set_flag to one.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
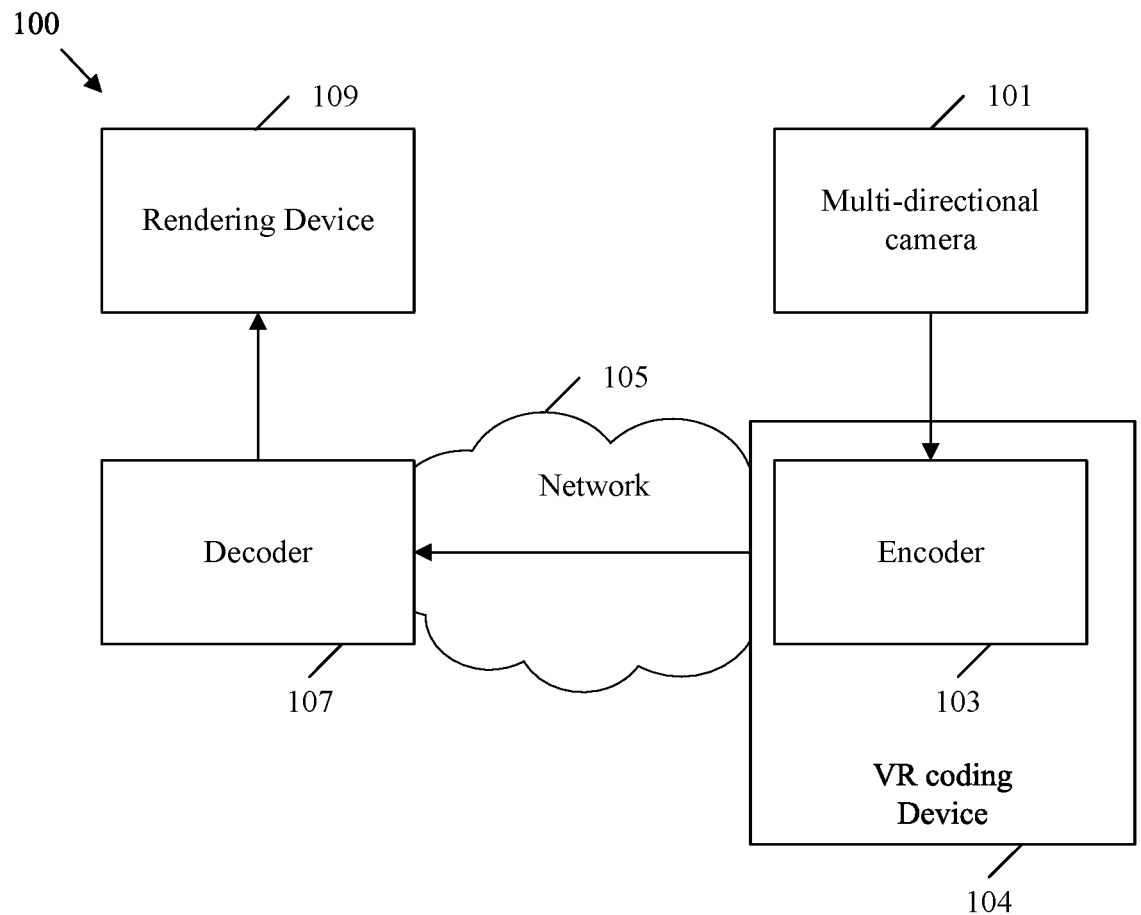
FIG. 1 is a schematic diagram of an example system for VR based video coding.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The present disclosure is related to VR, which may also be known as omnidirectional media, immersive media, and three hundred sixty degree media. VR is an interactive recorded and/or computer-generated experience taking place within a simulated environment and employing visual, audio, and/or haptic feedback. For a visual perspective, VR provides a sphere (or sub-portion of a sphere) of imagery with a user positioned at the center of the sphere. The sphere of imagery can be rendered by a head mounted display (HMD). Specifically, the HMD provides the user with a field of view (FOV), also known as a viewport, of the sphere. Hence, the user can look through the viewport to see a sub-portion of the sphere and move the user's head to dynamically change the position of the viewport. This provides the impression of being positioned inside an environment defined by the sphere. The sphere can also be presented in an offset manner to each of the user's eyes in order to provide the sensation of a three dimensional space. Each picture, also known as a frame, includes both the area of the sphere inside the user's FOV and the area of the sphere outside the user's FOV. Hence, a VR frame includes significantly more data than a non-VR video image.

In order to generate a VR video stream, a multi-dimensional array of cameras simultaneously records the sphere from all relevant angles. This produces multiple directional video streams, which are combined to create a single spherical video stream for use as the VR video stream. In order to compress the VR video stream, each frame of the stream can be split into sub-pictures of a predefined shape, such as rectangular, square, or other shape. Such sub-pictures create sub-picture video streams, which can then be encoded and sent to a user for decoding, reconstruction into a VR video stream, and viewport based display to the user. One mechanism to ensure the reconstruction occurs properly involves encoding every sub-picture video stream at the same resolution. However, this can still result in a very large file.

Viewport dependent coding is an example compression technique that can further reduce the file size of the VR video stream (e.g., to support VR based video streaming). Viewport-dependent coding uses the concept that the user only views the portion of the sphere in the viewport at any time. Accordingly, the area outside of the user's FOV can be transmitted at lower resolutions (e.g., with resolution dropping farther away from the current FOV). The resolutions of the sub-picture video streams can be increased or decreased dynamically as the FOV moves, for example, by dynamically selecting different representations of the sub-picture video streams at different resolutions. This approach reduces the overall file size of the VR video stream by reducing the video quality of the areas of the sphere that the user cannot see (e.g., and/or is deemed to be background and of limited importance at the time of encoding).

Viewport dependent coding may suffer from video coding errors in some cases. For example, a video stream, such as a sub-picture video stream, can be coded by employing inter-prediction. In inter-prediction, a block of pixels (e.g., representing an object) occurring in multiple frames can be encoded as a motion vector pointing from a current block to another block in a different frame that includes the pixels. In this manner, a block occurring over multiple frames can be coded once (e.g., via intra-prediction) and then referenced by a series of motion vectors in order to reduce redundancy and hence file size. Inter-prediction employs multiple modes. Some modes, such as merge mode and advance motion vector prediction (AMVP) mode, generate a candidate list of motion vectors for a current block based on neighbor blocks. Such modes signal a selected motion vector by signaling an index from the candidate list. In this way, an entire block of pixels can be coded as a single index value. Inter-prediction using candidate lists can create problems in viewport dependent coding when applied to adjacent sub-picture video streams that include different resolutions and/or frame rates. Specifically, a candidate list for a block at the edge of a first sub-picture video stream may be dependent on motion vectors used at a corresponding edge of an adjacent second sub-picture video stream. When the first sub-picture video stream and the second sub-picture video stream are transmitted at different resolutions/frame rates, resolution related data mismatches may occur causing the candidate list to contain unexpected motion vector values (or omit expected values). This results in the decoder generating an incorrect candidate list, which results in a misinterpretation of the candidate list index. Misinterpretation of the candidate list index causes errors in the decoded sub-picture video stream, and hence errors in the VR video stream displayed to the user. Similar issues can occur if a motion vector in one sub-picture video stream references a sample in another sub-picture video stream, as that sample may be unavailable and/or of a reduced resolution. In addition, video codecs may employ wavefront parallel processing (WPP) to encode/decode blocks of a video image in parallel. However, WPP can have effects on block level coding mechanisms, and hence decoding different portions of an image at different resolutions according to WPP can cause additional errors.

Various mechanisms can be employed to mitigate errors caused by the use of candidate lists in inter-prediction when inter-prediction is applied to sub-picture video streams of a VR video stream coded according to viewport dependent coding mechanisms. For example, when a sub-picture video signal is encoded, a current block in a sub-picture of the sub-picture video signal can only reference samples in reference blocks at full sample locations in the same sub-picture video stream, and hence cannot reference full or fractional sample locations from other sub-picture video streams. This applies to both intra-prediction and inter-prediction. Further, fractional sample locations in a sub-picture video stream may be referenced, but only if the sample at the fractional sample location can be recreated by interpolation based solely on full and/or fractional sample locations inside the same sub-picture bitstream. Further, when performing inter-prediction, motion vectors from blocks in adjacent sub-picture bitstreams are not included in motion vector candidate lists. These restrictions ensure that each sub-picture bitstream can be decoded without reference to a neighbor sub-picture bitstream, and hence resolution based mismatches are avoided. Further, WPP may not be used in conjunction with sub-picture bitstreams. For example, an entropy_coding_sync_enabled_flag in each picture parameter set (PPS) may be set to zero to disable WPP for the sub-picture video streams. Also, timing mismatch issues between the sub-picture bitstreams can be avoided by ensuring tracks containing the sub-picture video streams have the same presentation time and ensuring each sample from a common VR picture employ the same picture order count value even when such samples are split into different sub-picture bitstreams and/or carried in different tracks.

The foregoing mechanisms, or combinations thereof, ensure that each sub-picture bitstream is self-referenced, also referred to herein as self-contained. Sub-picture bitstreams that are self-referenced/self-contained are encoded in a completely self-referencing manner, and hence can be decoded without reference to other sub-picture bitstreams. A self-referenced sub-picture bitstream can be decoded and merged with other sub-picture bitstreams to reconstruct a spherical video stream according to a lightweight merging function as described in more detail below. The lightweight merging function may also be referred to as a lightweight bitstream rewriting process. The lightweight merging function can position and merge sub-pictures from each stream based on picture count and sub-picture position without checking and/or changing block level coding results for each sub-picture video stream. This approach employs significantly fewer computing resources at the decoder so long as the decoder is aware that the lightweight merging function can be applied to a corresponding set of sub-picture bitstreams without causing coding artifacts.

Disclosed herein are mechanisms to inform a decoder that sub-picture bitstreams are self-referenced, and hence can be reconstructed into a spherical video stream via a lightweight merging function. Specifically, a mergable indication may be employed to indicate that a lightweight merging function can be applied to the sub-picture bitstreams. The encoder can include the mergable indication in the corresponding sub-picture bitstreams. For example the mergable indication can be included in a supplemental enhancement information (SEI) message, such as a temporal motion constrained tile set (MCTS) SEI message and/or a lightweight merging SEI message. In other examples, the mergable indication can be included as data in a video parameter set (VPS) and/or a sequence parameter set (SPS) in the corresponding sub-picture bitstream. As a specific example, the mergable indication can be included in a VPS and/or SPS as video usability information (VUI). As another specific example, the mergable indication can be included in a VPS and/or SPS in a profile tier level syntax structure, for example as a lightweight merging indication flag between a general profile compatibility flag and a general level identification code (idc) flag. With the above signaling mechanisms, an entity that supports rewriting/merging of multiple sub-picture bitstreams into one conforming virtual reality video bitstream can determine whether certain sub-picture bitstreams can be merged/rewritten into one conforming video bitstream without altering block coding results for each sub-picture bitstream to account for viewport dependent coding artifacts based on sub-picture bitstream resolution variability.

FIG. 1 is a schematic diagram of an example system 100 for VR based video coding. System 100 includes a multi-directional camera 101, a VR coding device 104 including an encoder 103, a decoder 107, and a rendering device 109. The multi-directional camera 101 comprises an array of camera devices. Each camera device is pointed at a different angle so that the multi-directional camera 101 can take multiple directional video streams of the surrounding environment from a plurality of angles. For example, multi-directional camera 101 can take video of the environment as a sphere with the multi-directional camera 101 at the center of the sphere. As used herein, sphere and/or spherical video refer to both a geometrical sphere and sub-portions of a geometrical sphere, such as spherical caps, spherical domes, spherical segments, etc. For example, a multi-directional camera 101 may take a one hundred and eighty degree video to cover half of the environment so that a production crew can remain behind the multi-directional camera 101. A multi-directional camera 101 can also take video in three hundred sixty degrees (or any sub-portion thereof). However, a portion of the floor under the multi-directional camera 101 may be omitted, which results in video of less than a perfect sphere. Hence, the term sphere, as used herein, is a general term used for clarity of discussion and should not be considered limiting from a geometrical stand point.

Video from the multi-directional camera 101 is forwarded to the VR coding device 104. A VR coding device 104 may be a computing system including specialized VR coding software. The VR coding device 104 may include an encoder 103. In some examples, the encoder 103 can also be included in a separate computer system from the VR coding device 104. The VR coding device 104 is configured to convert the multiple directional video streams into a single multiple directional video stream including the entire recorded area from all relevant angles. This conversion may be referred to as image stitching. For example, frames from each video stream that are captured at the same time can be stitched together to create a single spherical image. A spherical video stream can then be created from the spherical images. For clarity of discussion, it should be noted that the terms frame, picture, and image may be interchangeably herein unless specifically noted.

The spherical video stream can then be forwarded to the encoder 103 for compression. An encoder 103 is a device and/or program capable of converting information from one format to another for purposes of standardization, speed, and/or compression. Standardized encoders 103 are configured to encode rectangular and/or square images. Accordingly, the encoder 103 is configured to map each spherical image from the spherical video stream into a plurality of sub-pictures in a predefined shape, such as rectangular, square, or other two dimensional geometric shape. While the spherical image may be mapped into sub-pictures of any shape, the sub-pictures may be referred to below as rectangular for purposes of clarity and brevity. However, such a rectangular shape should not be considered limiting absent contextual indications to the contrary. Upon completion of the mapping, the sub-pictures can be placed in separate sub-picture video streams. As such, each sub-picture video stream displays a stream of images over time as recorded from a sub-portion of the spherical video stream. The encoder 103 can then encode each sub-picture video stream to compress the video stream to a manageable file size. The encoding process is discussed in more detail below. In general, the encoder 103 partitions each frame from each sub-picture video stream into pixel blocks, compresses the pixel blocks by inter-prediction and/or intra-prediction to create coding blocks including prediction blocks and residual blocks, applies transforms to the residual blocks for further compression, and applies various filters to the blocks. The compressed blocks as well as corresponding syntax are stored in bitstream(s), for example in ISOBMFF and/or in omnidirectional media format (OMAF).

The VR coding device 104 may store the encoded bitstream(s) in memory, locally and/or on a server, for communication to a decoder 107 on demand. The data can be forwarded via a network 105, which may include the Internet, a mobile telecommunications network (e.g., a long term evolution (LTE) based data network), or other data communication data system.

The decoder 107 is a device on a user's location that is configured to reverse the coding process to reconstruct the sub-picture video streams from the encoded bitstream(s). The decoder 107 also merges the sub-picture video streams to reconstruct the spherical video stream. The spherical video stream, or sub-portions thereof, can then be forwarded to the rendering device 109. The rendering device 109 is a device configured to display the spherical video stream to the user. For example, the rendering device 109 may include a HMD that is attached to the user's head and covers the user's eyes. The rendering device 109 may include a screen for each eye, cameras, motion sensors, speakers, etc. and may communicate with the decoder 107 via wireless and/or wired connections. The rendering device 109 may display a sub-portion of the spherical video stream to the user. The sub-portion shown is based on the FOV and/or viewport of the rendering device. For example, the rendering device 109 may change the position of the FOV based on user head movement by employing the motion tracking sensors. This allows the user to see different portions of the spherical video stream depending on head movement. Further, the rendering device 109 may offset the FOV for each eye based on the user's interpupillary distance (IPD) to create the impression of a three dimensional space.

It should be noted that a video stream, such as a spherical video stream, a sub-picture video stream, etc. can also be referred to as a video signal, a video sequence, etc. When encoded, a video stream can be referred to as a bitstream. Also, multi-directional can also be referred to as multiple directional. In addition, frame and sub-frames can also be referred to as pictures and sub-pictures, respectively.

Figure 2:
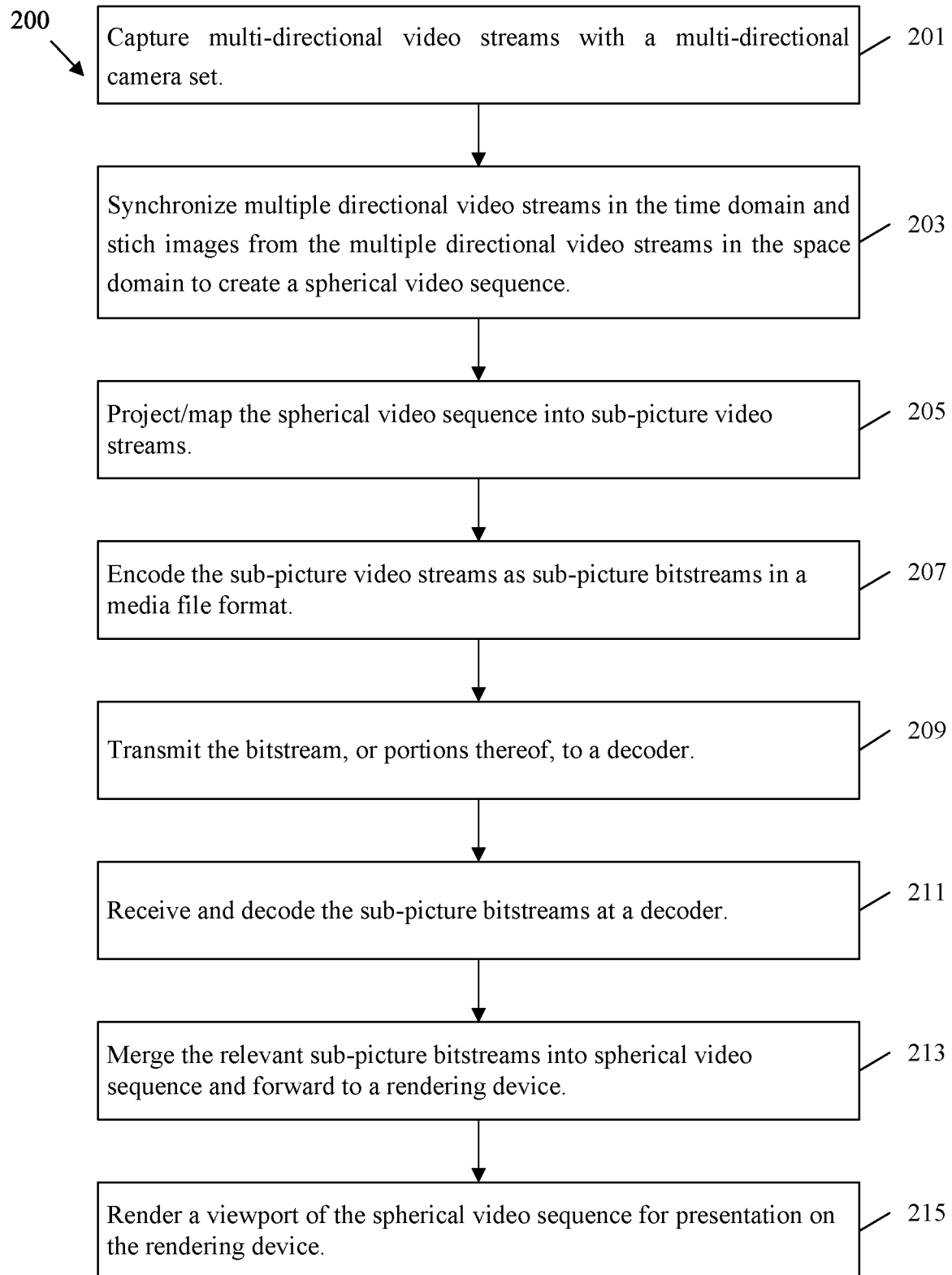
FIG. 2 is a flowchart of an example method of coding a VR picture bitstream as a plurality of sub-picture bitstreams.

FIG. 2 is a flowchart of an example method 200 of coding a VR picture bitstream as a plurality of sub-picture bitstreams, for example by employing the components of system 100. At step 201, a multi-directional camera set, such as multi-directional camera 101, is used to capture multiple directional video streams. The multiple directional video streams include views of an environment at various angles. For example, the multiple directional video streams may capture video from three hundred sixty degrees, one hundred eighty degrees, two hundred forty degrees, etc. around the camera in a plane (e.g., the horizontal plane). The multiple directional video streams may also capture video from three hundred sixty degrees, one hundred eighty degrees, two hundred forty degrees, etc. around the camera in the vertical plane. The result is to create video that includes information sufficient to cover a spherical area around the camera over some period of time.

At step 203, the multiple directional video streams are synchronized in the time domain. Specifically, each directional video stream includes a series of images taken at a corresponding angle. The multiple directional video streams are synchronized by ensuring frames from each directional video stream that were captured at the same time domain position are processed together. The frames from the directional video streams can then be stitched together in the space domain to create a spherical video stream. Hence, each frame of the spherical video stream contains data taken from the frames of all the directional video streams that occur at a common temporal position.

At step 205, the spherical video stream is mapped into sub-picture video streams (e.g., rectangular, square, etc.) This process may also be referred to as projecting the spherical video stream into rectangular sub-picture video streams. As noted above, encoders and decoders are generally designed to encode rectangular and/or square frames. Accordingly, mapping the spherical video stream into sub-picture video streams creates video streams that can be encoded and decoded by non-VR specific encoders and decoders, respectively. It should be noted that steps 203 and 205 are specific to VR video processing, and hence may be performed by specialized VR hardware, software, or combinations thereof.

At step 207, the rectangular sub-picture video streams can be forwarded to an encoder, such as encoder 103. The encoder then encodes the sub-picture video streams as sub-picture bitstreams in a corresponding media file format. Specifically, each sub-picture video stream can be treated by the encoder as a video signal. The encoder can encode each frame of each sub-picture video stream via inter-prediction, intra-prediction, etc. Such encoding and corresponding decoding as well as encoders and decoders are discussed in detail with respect to FIGS. 3-14 below. Regarding file format, the sub-picture video streams can be stored in ISOBMFF. For example, the sub-picture video streams are captured at a specified resolution. The sub-picture video streams can then be downsampled to various lower resolutions for encoding. Each resolution can be referred to as a representation. Lower quality representations lose image clarity while reducing file size. Accordingly, lower quality representations can be transmitted to a user using fewer network resources (e.g., time, bandwidth, etc.) than higher quality representations with an attendant loss of visual quality. Each representation can be stored in a corresponding set of tracks. Hence, tracks can be sent to a user, where the tracks include the sub-picture bitstreams at various resolutions (e.g., visual quality).

At step 209, the sub-picture bitstreams can be sent to the decoder as tracks. In some examples, all sub-picture bitstreams are transmitted at the same quality by transmitting tracks from the same representation. The downside to this approach is that areas of the final VR video stream that are of less concern are transmitted at the same resolution as all other areas. Viewport dependent coding can be used to improve compression over such an approach. In viewport dependent coding, the tracks containing sub-picture bitstreams with data in the users FOV are sent at higher resolutions by selecting higher quality representations. Tracks containing sub-picture bitstreams with areas outside the users FOV can be sent at progressively lower resolutions by selecting lower quality representations. Some areas may even be completely omitted in some examples. For example, areas adjacent to the FOV can be sent at slightly reduced quality in case the user decides to change the FOV to include such areas. Areas farther away from the FOV can be sent at progressively lower quality as such areas are progressively more unlikely to enter the FOV and hence are progressively more unlikely to ever be rendered for the user. The tracks may include relatively short video segments (e.g., about three seconds), and hence the representations selected for particular areas of the video can change over time based on changes in the FOV. This allows quality to change as the users FOV changes. Viewport dependent coding may significantly reduce the file size of the tracks sent to the user without significant losses in visual quality because the areas of reduced quality are unlikely to be seen by the user.

At step 211, a decoder, such as decoder 107, receives the tracks containing the sub-picture bitstreams. The decoder can then decode the sub-picture bitstreams into sub-picture video streams for display. The decoding process involves the reverse of the encoding process (e.g., using inter-prediction and intra-prediction), and is discussed in more detail with respect to FIGS. 3-10 below.

At step 213, the decoder can merge the sub-picture video streams into the spherical video stream for presentation to the user. Specifically, the decoder can employ a multi-bitstream merge function, such as a so called lightweight merging algorithm, that selects frames from each sub-picture video stream that occur at the same presentation time and merges them together based on the position and/or angle associated with the corresponding sub-picture video stream. The lightweight merging algorithm may not make changes to the block level coding results associated with the sub-pictures. Hence the lightweight merging algorithm employs significantly fewer computing resources than decoding complete spherical video frames based on the sub-picture bitstreams. The decoder may also employ filters to smooth edges between the sub-picture video streams, remove artifacts, etc. The decoder can then forward the spherical video stream to a rendering device, such as rendering device 109.

At step 215, the rendering device renders a viewport of the spherical video stream for presentation to the user. As mentioned above, areas of the spherical video stream outside of the FOV at each point in time are not rendered. Hence, in viewport dependent coding, lower quality representations are effectively omitted, and hence the reduction in viewing quality has a negligible impact on user experience while reducing file size.

Viewport dependent coding, as applied to system 100 and method 200, decreases file sizes without significant loss of visual quality for the user. However, this approach may cause certain video coding errors in some cases. Specifically, inter-prediction and intra-prediction that extends over the boundaries of the sub-picture video streams may create artifacts when the sub-picture video streams are of different representations. This is because lower quality representations are lossy and omit data to reduce file size. A high quality sub-picture video stream may encode pixels based on data that is removed from adjacent lower quality sub-picture video streams. As such, the high quality sub-picture video streams may be decoded incorrectly when such data has been removed from the adjacent lower quality sub-picture video streams. The present disclosure includes mechanisms to constrain the encoding of sub-picture video streams to ensure each sub-picture video stream is self-contained, and hence such errors do not occur when the lightweight merging algorithm is applied at the decoder. FIGS. 3-10 describe encoding processes and systems applied to each sub-picture video stream and FIGS. 11-14 describe mechanisms for encoding a mergable indication to alert a decoder that the sub-picture video streams are self-referenced and hence can be reconstructed via the lightweight merging algorithm.

Figure 3:
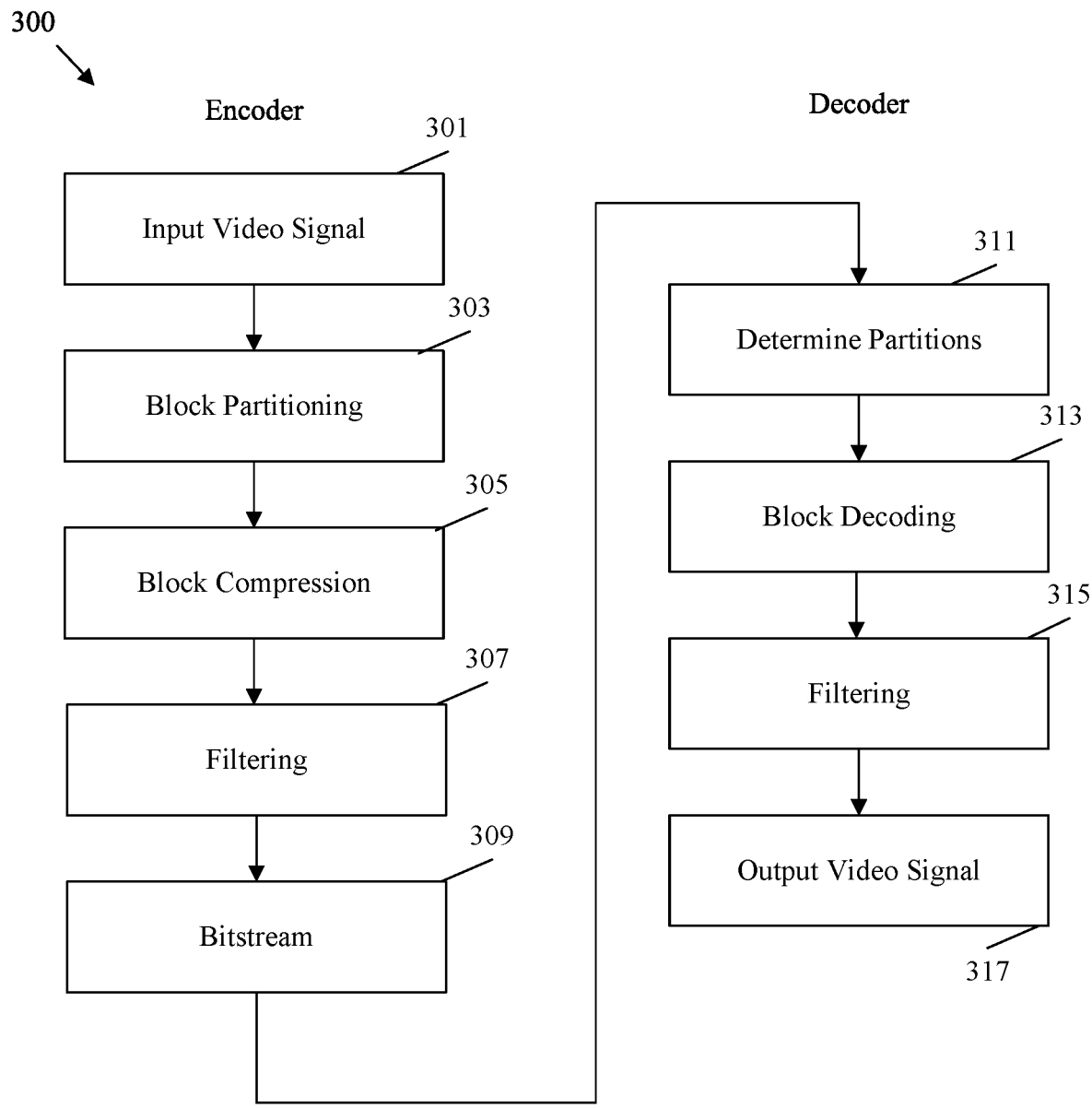
FIG. 3 is a flowchart of an example method of coding a video signal including a sub-picture video stream.

FIG. 3 is a flowchart of an example method 300 of coding a video signal including a sub-picture video stream. For example, method 300 may receive a plurality of sub-picture video streams from step 205 of method 200. Method 300 treats each sub-picture video stream as a video signal input. Method 300 applies steps 301-317 to each sub-picture video stream in order to implement steps 207-211 of method 200. Hence, the output video signal from method 300 includes the decoded sub-picture video streams, which can be merged and displayed according to steps 213 and 215 of method 200.

Method 300 encodes a video signal, for example including sub-picture video streams, at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 301, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components (or luma samples), and color, which is referred to as chroma components (or color samples).

At step 303, the video signal is partitioned into blocks. Partitioning includes subdividing the pixels in each frame into square and/or rectangular blocks for compression. For example, in High Efficiency Video Coding (HEVC) (also known as H.265 and MPEG-H Part 2) the frame can first be divided into coding tree units (CTUs), which are blocks of a predefined size (e.g., sixty four pixels by sixty four pixels). The CTUs contain both luma and chroma samples. As used herein, a sample, also known as a pixel, is a value of an image (e.g., a luminance/light value or chrominance/color value) at a corresponding location. Coding trees may be employed to divide the CTUs into blocks and then recursively subdivide the blocks until configurations are achieved that support further encoding. For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 305, various compression mechanisms are employed to compress the image blocks partitioned at step 303. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in adjacent frames. Specifically, an object, such as a table, may remain in a constant position over multiple frames. Hence the table is described once and adjacent frames can refer back to the reference frame. Pattern matching mechanisms may be employed to match objects over multiple frames. Further, moving objects may be represented across multiple frames, for example due to object movement or camera movement. As a particular example, a video may show an automobile that moves across the screen over multiple frames. Motion vectors can be employed to describe such movement, or lack thereof. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty three in HEVC), a planar mode, and a direct current (DC) mode. The directional modes indicate that a current block is similar/the same as samples of a neighbor block in a corresponding direction. Planar mode indicates that a series of blocks along a row/column (e.g., a plane) can be interpolated based on neighbor blocks at the edges of the row. Planar mode, in effect, indicates a smooth transition of light/color across a row/column by employing a relatively constant slope in changing values. DC mode is employed for boundary smoothing and indicates that a block is similar/the same as an average value associated with samples of all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 307, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in the reconstructed reference blocks so that artifacts are less likely to create additional artifacts in subsequent blocks that are encoded based on the reconstructed reference blocks.

Once the video signal has been partitioned, compressed, and filtered, the resulting data is encoded in a bitstream at step 309. The bitstream includes the data discussed above as well as any signaling data (e.g., syntax) desired to support proper video signal reconstruction at the decoder. For example, such data may include partition data, prediction data, residual blocks, and various flags providing coding instructions to the decoder. The bitstream may be stored in memory for transmission toward a decoder upon request, for example as a track and/or track fragment in ISBBMFF. The bitstream may also be broadcast and/or multicast toward a plurality of decoders. The creation of the bitstream is an iterative process. Accordingly, steps 301, 303, 305, 307, and 309 may occur continuously and/or simultaneously over many frames and blocks. The order shown in FIG. 3 is presented for clarity and ease of discussion, and is not intended to limit the video coding process to a particular order.

The decoder receives the bitstream and begins the decoding process at step 311. For example, the decoder can employ an entropy decoding scheme to convert the bitstream into corresponding syntax and video data. The decoder employs the syntax data from the bitstream to determine the partitions for the frames at step 311. The partitioning should match the results of block partitioning at step 303. Entropy encoding/decoding, which may be employed in step 311, is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving a set of allowable options. Each allowable option is then assigned a code word. The length of the code words is based on the number of allowable options (e.g., one bin for two options, two bins for three to four options, etc.) The encoder then encodes the code word for the selected option. This scheme reduces the size of the code words as the code words are as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 313, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 305. The reconstructed image blocks are then positioned into frames of a reconstructed video signal according to the partitioning data determined at step 311. Syntax for step 313 may also be signaled in the bitstream via entropy coding as discussed above.

At step 315, filtering is performed on the frames of the reconstructed video signal in a manner similar to step 307 at the encoder. For example, noise suppression filters, de-blocking filters, adaptive loop filters, and SAO filters may be applied to the frames to remove blocking artifacts. Once the frames are filtered, the video signal can be forwarded for merging at step 317 and then output to a display, such as a HMD, for viewing by an end user.

The present disclosure relates to modifications to prevent artifacts when sub-picture video streams from a VR video stream are encoded at a particular resolution and then decoded at varying resolutions according to viewport dependent coding. Such artifacts occur due to mechanisms in block compression at step 305. The present disclosure also relates to signaling that a sub-picture bitstream is encoded in a self-referencing fashion, and hence a lightweight merge function can be employed to decode the sub-picture bitstream without such artifacts. Hence, the present disclosure improves the functionality of block compression at step 305 at the encoder and block decoding at step 313 at the decoder. These result in a reduced file size, and hence increased coding efficiency, a faster decoding process, and hence reduction on utilization of processing resources, and/or results in increased visual quality of the resulting decoded VR video stream at the decoder.

Figure 4:
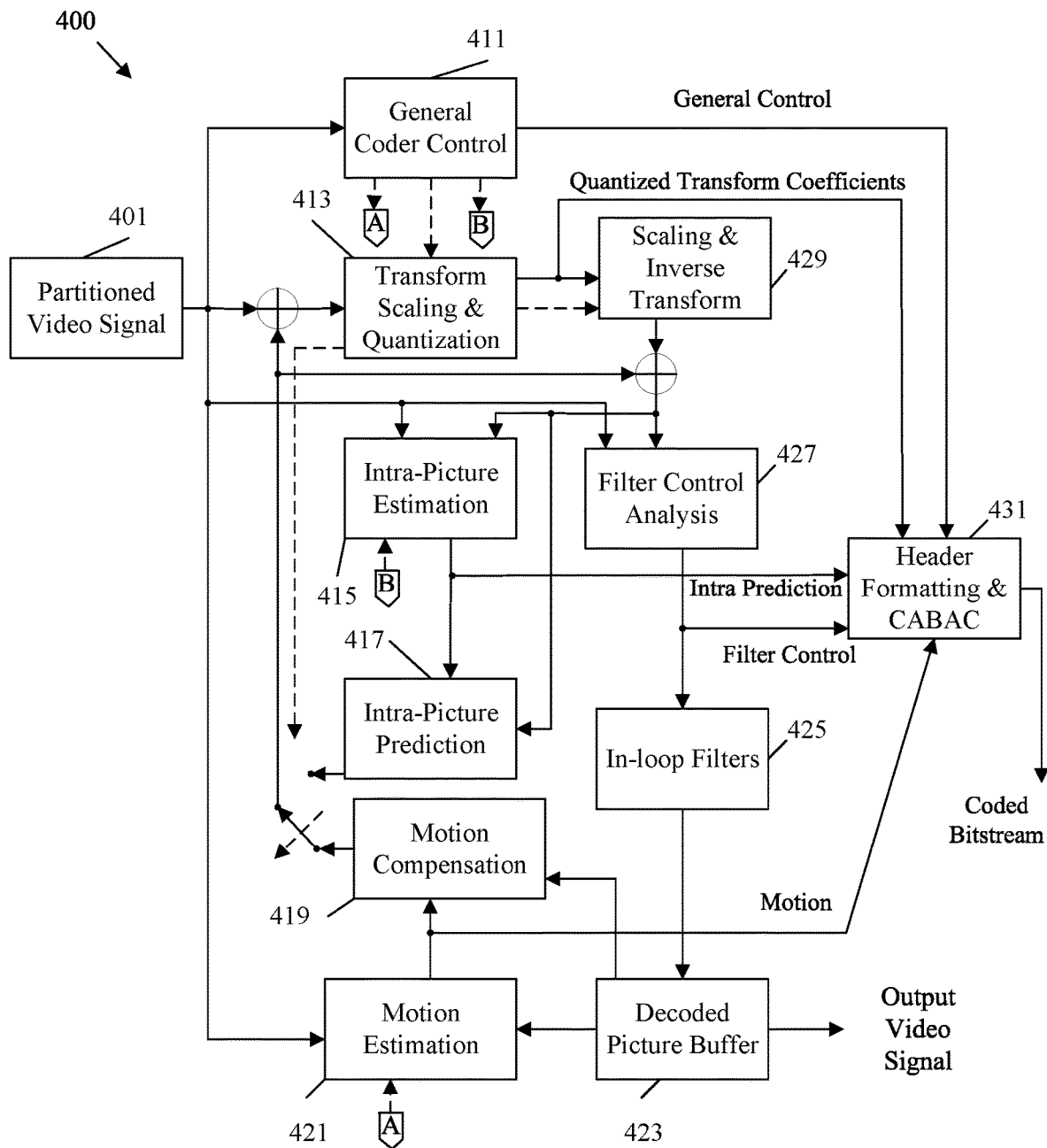
FIG. 4 is a schematic diagram of an example coding and decoding (codec) system for video coding.

FIG. 4 is a schematic diagram of an example coding and decoding (codec) system 400 for video coding. Specifically, codec system 400 provides functionality to support encoding and decoding sub-picture video streams according to methods 200 and 300. Further, codec system 400 can be employed to implement an encoder 103 and/or a decoder 107 of system 100.

Codec system 400 is generalized to depict components employed in both an encoder and a decoder. Codec system 400 receives and partitions frames to form a video signal (e.g., including a sub-picture video stream) as discussed with respect to steps 301 and 303 in operating method 300, which results in partitioned video signals 401. Codec system 400 then compresses the partitioned video signals 401 into a coded bitstream when acting as an encoder as discussed with respect to steps 305, 307, and 309 in method 300. When acting as a decoder, codec system 400 generates an output video signal from the bitstream as discussed with respect to steps 311, 313, 315, and 317 in operating method 300. The codec system 400 includes a general coder control component 411, a transform scaling and quantization component 413, an intra-picture estimation component 415, an intra-picture prediction component 417, a motion compensation component 419, a motion estimation component 421, a scaling and inverse transform component 429, a filter control analysis component 427, an in-loop filters component 425, a decoded picture buffer component 423, and a header formatting and context adaptive binary arithmetic coding (CABAC) component 431. Such components are coupled as shown. In FIG. 4, black lines indicate movement of data to be encoded/decoded while dashed lines indicate movement of control data that controls the operation of other components. The components of codec system 400 may all be present in the encoder. The decoder may include a subset of the components of codec system 400. For example, the decoder may include the intra-picture prediction component 417, the motion compensation component 419, the scaling and inverse transform component 429, the in-loop filters component 425, and the decoded picture buffer component 423. These components are now described.

The partitioned video signal 401 is a captured video sequence that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The divided blocks can be included in coding units (CUs) in some cases. For example, a CU can be a sub-portion of a CTU that contains a luma block, red difference chroma (Cr) block(s), and a blue difference chroma (Cb) block(s) along with corresponding syntax instructions for the CU. The split modes may include a binary tree (BT), triple tree (TT), and a quad tree (QT) employed to partition a node into two, three, or four child nodes, respectively, of varying shapes depending on the split modes employed. The partitioned video signal 401 is forwarded to the general coder control component 411, the transform scaling and quantization component 413, the intra-picture estimation component 415, the filter control analysis component 427, and the motion estimation component 421 for compression.

The general coder control component 411 is configured to make decisions related to coding of the images of the video sequence into the bitstream according to application constraints. For example, the general coder control component 411 manages optimization of bitrate/bitstream size versus reconstruction quality. Such decisions may be made based on storage space/bandwidth availability and image resolution requests. The general coder control component 411 also manages buffer utilization in light of transmission speed to mitigate buffer underrun and overrun issues. To manage these issues, the general coder control component 411 manages partitioning, prediction, and filtering by the other components. For example, the general coder control component 411 may dynamically increase compression complexity to increase resolution and increase bandwidth usage or decrease compression complexity to decrease resolution and bandwidth usage. Hence, the general coder control component 411 controls the other components of codec system 400 to balance video signal reconstruction quality with bit rate concerns. The general coder control component 411 creates control data, which controls the operation of the other components. The control data is also forwarded to the header formatting and CABAC component 431 to be encoded in the bitstream to signal parameters for decoding at the decoder.

The partitioned video signal 401 is also sent to the motion estimation component 421 and the motion compensation component 419 for inter-prediction. A frame or slice of the partitioned video signal 401 may be divided into multiple video blocks. Motion estimation component 421 and the motion compensation component 419 perform inter-predictive coding of the received video block relative to one or more blocks in one or more reference frames to provide temporal prediction. Codec system 400 may perform multiple coding passes, e.g., to select an appropriate coding mode for each block of video data.

Motion estimation component 421 and motion compensation component 419 may be highly integrated, but are illustrated separately for conceptual purposes. Motion estimation, performed by motion estimation component 421, is the process of generating motion vectors, which estimate motion for video blocks. A motion vector, for example, may indicate the displacement of a coded object relative to a predictive block. A predictive block is a block that is found to closely match the block to be coded, in terms of pixel difference. A predictive block may also be referred to as a reference block. Such pixel differences may be determined by sum of absolute difference (SAD), sum of square difference (SSD), or other difference metrics. HEVC employs several coded objects including a CTU, coding tree blocks (CTBs), and CUs. For example, a CTU can be divided into CTBs, which can then be divided into CBs for inclusion in CUs. A CU can be encoded as a prediction unit (PU) containing prediction data and/or a transform unit (TU) containing transformed residual data for the CU. The motion estimation component 421 generates motion vectors, PUs, and TUs by using a rate-distortion analysis as part of a rate distortion optimization process. For example, the motion estimation component 421 may determine multiple reference blocks, multiple motion vectors, etc. for a current block/frame, and may select the reference blocks, motion vectors, etc. having the best rate-distortion characteristics. The best rate-distortion characteristics balance both quality of video reconstruction (e.g., amount of data loss by compression) with coding efficiency (e.g., size of the final encoding).

In some examples, codec system 400 may calculate values for sub-integer pixel positions of reference pictures stored in decoded picture buffer component 423. For example, video codec system 400 may interpolate values of one-quarter pixel positions, one-eighth pixel positions, or other fractional pixel positions of the reference picture. Therefore, motion estimation component 421 may perform a motion search relative to the full pixel positions and fractional pixel positions and output a motion vector with fractional pixel precision. The motion estimation component 421 calculates a motion vector for a PU of a video block in an inter-coded slice by comparing the position of the PU to the position of a predictive block of a reference picture. Motion estimation component 421 outputs the calculated motion vector as motion data to header formatting and CABAC component 431 for encoding and motion to the motion compensation component 419.

Motion compensation, performed by motion compensation component 419, may involve fetching or generating the predictive block based on the motion vector determined by motion estimation component 421. Again, motion estimation component 421 and motion compensation component 419 may be functionally integrated, in some examples. Upon receiving the motion vector for the PU of the current video block, motion compensation component 419 may locate the predictive block to which the motion vector points. A residual video block is then formed by subtracting pixel values of the predictive block from the pixel values of the current video block being coded, forming pixel difference values. In general, motion estimation component 421 performs motion estimation relative to luma components, and motion compensation component 419 uses motion vectors calculated based on the luma components for both chroma components and luma components. The predictive block and residual block are forwarded to transform scaling and quantization component 413.

The partitioned video signal 401 is also sent to intra-picture estimation component 415 and intra-picture prediction component 417. As with motion estimation component 421 and motion compensation component 419, intra-picture estimation component 415 and intra-picture prediction component 417 may be highly integrated, but are illustrated separately for conceptual purposes. The intra-picture estimation component 415 and intra-picture prediction component 417 intra-predict a current block relative to blocks in a current frame, as an alternative to the inter-prediction performed by motion estimation component 421 and motion compensation component 419 between frames, as described above. In particular, the intra-picture estimation component 415 determines an intra-prediction mode to use to encode a current block. In some examples, intra-picture estimation component 415 selects an appropriate intra-prediction mode to encode a current block from multiple tested intra-prediction modes. The selected intra-prediction modes are then forwarded to the header formatting and CABAC component 431 for encoding.

For example, the intra-picture estimation component 415 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 415 calculates ratios from the distortions and rates for the various encoded blocks to determine which intra-prediction mode exhibits the best rate-distortion value for the block. In addition, intra-picture estimation component 415 may be configured to code depth blocks of a depth map using a depth modeling mode (DMM) based on rate-distortion optimization (RDO).

The intra-picture prediction component 417 may generate a residual block from the predictive block based on the selected intra-prediction modes determined by intra-picture estimation component 415 when implemented on an encoder or read the residual block from the bitstream when implemented on a decoder. The residual block includes the difference in values between the predictive block and the original block, represented as a matrix. The residual block is then forwarded to the transform scaling and quantization component 413. The intra-picture estimation component 415 and the intra-picture prediction component 417 may operate on both luma and chroma components.

The transform scaling and quantization component 413 is configured to further compress the residual block. The transform scaling and quantization component 413 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 413 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 413 is also configured to quantize the transform coefficients to further reduce bit rate. The quantization process may reduce the bit depth associated with some or all of the coefficients. The degree of quantization may be modified by adjusting a quantization parameter. In some examples, the transform scaling and quantization component 413 may then perform a scan of the matrix including the quantized transform coefficients. The quantized transform coefficients are forwarded to the header formatting and CABAC component 431 to be encoded in the bitstream.

The scaling and inverse transform component 429 applies a reverse operation of the transform scaling and quantization component 413 to support motion estimation. The scaling and inverse transform component 429 applies inverse scaling, transformation, and/or quantization to reconstruct the residual block in the pixel domain, e.g., for later use as a reference block which may become a predictive block for another current block. The motion estimation component 421 and/or motion compensation component 419 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 427 and the in-loop filters component 425 apply the filters to the residual blocks and/or to reconstructed image blocks. For example, the transformed residual block from the scaling and inverse transform component 429 may be combined with a corresponding prediction block from intra-picture prediction component 417 and/or motion compensation component 419 to reconstruct the original image block. The filters may then be applied to the reconstructed image block. In some examples, the filters may instead be applied to the residual blocks. As with other components in FIG. 4, the filter control analysis component 427 and the in-loop filters component 425 are highly integrated and may be implemented together, but are depicted separately for conceptual purposes. Filters applied to the reconstructed reference blocks are applied to particular spatial regions and include multiple parameters to adjust how such filters are applied. The filter control analysis component 427 analyzes the reconstructed reference blocks to determine where such filters should be applied and sets corresponding parameters. Such data is forwarded to the header formatting and CABAC component 431 as filter control data for encoding. The in-loop filters component 425 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer component 423 for later use in motion estimation as discussed above. When operating as a decoder, the decoded picture buffer component 423 stores and forwards the reconstructed and filtered blocks toward a display as part of an output video signal. The decoded picture buffer component 423 may be any memory device capable of storing prediction blocks, residual blocks, and/or reconstructed image blocks.

The header formatting and CABAC component 431 receives the data from the various components of codec system 400 and encodes such data into a coded bitstream for transmission toward a decoder. Specifically, the header formatting and CABAC component 431 generates various headers to encode control data, such as general control data and filter control data. Further, prediction data, including intra-prediction and motion data, as well as residual data in the form of quantized transform coefficient data are all encoded in the bitstream. The final bitstream includes the information desired by the decoder to reconstruct the original partitioned video signal 401. Such information may also include intra-prediction mode index tables (also referred to as codeword mapping tables), definitions of encoding contexts for various blocks, indications of most probable intra-prediction modes, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

The present disclosure includes modifications to prevent artifacts when sub-picture video streams from a VR video stream are encoded at a particular resolution and then decoded at varying resolutions according to viewport dependent coding. Such artifacts occur due to mechanisms in intra-prediction according to intra-picture estimation component 415 and/or intra-picture prediction component 417 and inter-prediction according to a motion compensation component 419 and/or a motion estimation component 421. Hence, the present disclosure improves the functionality of intra-picture estimation component 415, intra-picture prediction component 417, motion compensation component 419, and/or a motion estimation component 421 at an encoder and/or decoder. Once such modifications are made, the sub-picture bitstreams can be considered self-referencing, and hence can be decoded according to a lightweight merge process. This results in a reduced file size, and hence increased coding efficiency, a faster decoding process, and hence reduction on utilization of processing resources, and/or results in increased visual quality of the resulting decoded VR video stream at the decoder.

Figure 5:
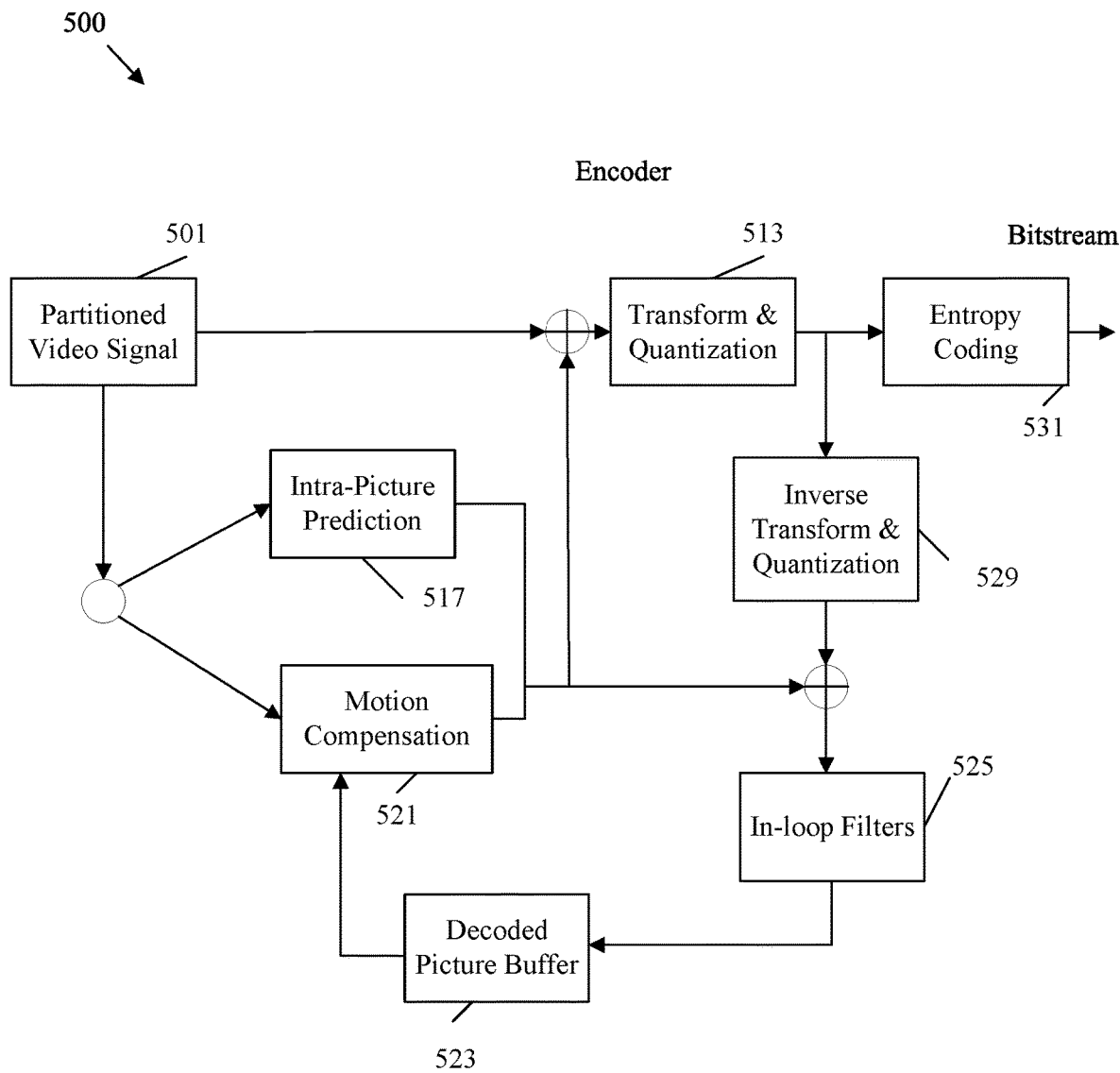
FIG. 5 is a schematic diagram illustrating an example video encoder that may encode sub-picture bitstreams.

FIG. 5 is a block diagram illustrating an example video encoder 500 that may encode sub-picture bitstreams. Video encoder 500 may be employed to implement the encoding functions of codec system 400 and/or implement steps 301, 303, 305, 307, and/or 309 of method 300. Further, encoder 500 may be employed to implement steps 205-209 of method 200 as well as encoder 103. Encoder 500 partitions an input video signal (e.g., a sub-picture video stream), resulting in a partitioned video signal 501, which is substantially similar to the partitioned video signal 401. The partitioned video signal 501 is then compressed and encoded into a bitstream by components of encoder 500.

Specifically, the partitioned video signal 501 is forwarded to an intra-picture prediction component 517 for intra-prediction. The intra-picture prediction component 517 may be substantially similar to intra-picture estimation component 415 and intra-picture prediction component 417. The partitioned video signal 501 is also forwarded to a motion compensation component 521 for inter-prediction based on reference blocks in a decoded picture buffer component 523. The motion compensation component 521 may be substantially similar to motion estimation component 421 and motion compensation component 419. The prediction blocks and residual blocks from the intra-picture prediction component 517 and the motion compensation component 521 are forwarded to a transform and quantization component 513 for transform and quantization of the residual blocks. The transform and quantization component 513 may be substantially similar to the transform scaling and quantization component 413. The transformed and quantized residual blocks and the corresponding prediction blocks (along with associated control data) are forwarded to an entropy coding component 531 for coding into a bitstream. The entropy coding component 531 may be substantially similar to the header formatting and CABAC component 431.

The transformed and quantized residual blocks and/or the corresponding prediction blocks are also forwarded from the transform and quantization component 513 to an inverse transform and quantization component 529 for reconstruction into reference blocks for use by the motion compensation component 521. The inverse transform and quantization component 529 may be substantially similar to the scaling and inverse transform component 429. In-loop filters in an in-loop filters component 525 are also applied to the residual blocks and/or reconstructed reference blocks, depending on the example. The in-loop filters component 525 may be substantially similar to the filter control analysis component 427 and the in-loop filters component 425. The in-loop filters component 525 may include multiple filters as discussed with respect to in-loop filters component 425. The filtered blocks are then stored in a decoded picture buffer component 523 for use as reference blocks by the motion compensation component 521. The decoded picture buffer component 523 may be substantially similar to the decoded picture buffer component 423.

The encoder 500 receives sub-picture video streams split from a spherical video stream for use in conjunction with a VR system using viewport dependent coding. As noted above, when sub-picture video streams are transmitted to a decoder at varying resolutions, artifacts can occur due to data lost in the process of reducing resolutions for the lower quality sub-picture video streams. This is because both intra-prediction and inter-prediction encode blocks based on samples (pixels) from adjacent blocks. When the references cross sub-picture video stream boundaries, the references may become inaccurate due to loss of data in an adjacent sub-picture video stream. In order to mitigate these issues, the motion compensation component 521 and the intra-picture prediction component 517 of encoder 500 encode each sub-picture video stream to be self-referenced and hence self-contained. Specifically, the motion compensation component 521 and the intra-picture prediction component 517 are configured to only reference full sample locations in the same sub-picture video stream during encoding. Specifically, when a first sub-picture video stream is being encoded, the encoder 500 is prevented from referencing full sample locations from other sub-picture video streams. This applies to both intra-prediction modes and inter-prediction motion vectors.

As noted above, a sample, also known as a pixel, is a value at a corresponding location, where value can include a luma/light value and/or one or more chroma/color values. Recording devices take pictures (and displays display) by expressing values at integer positions on a sampling grid. An integer position on a sampling grid is known as a full sample location, because a sample value is expressed at a full sample location. A fractional sample location is a position that is not an integer position on the sampling grid. Fractional sample locations may be employed when objects are displaced by non-integer distances between frames and when performing filtering. A value at a fractional sample location can be determined as a weighted value (e.g., weighted average) determined based on the values at full sample locations. The motion compensation component 521 and the intra-picture prediction component 517 may reference such fractional sample locations in the first sub-picture video stream, but only when the effective sample value at the referenced fractional sample location can be recreated by interpolation based solely on sample locations inside the first sub-picture bitstream (e.g., without reference to any other sub-picture bitstream). Further, the motion compensation component 521 may generate motion vector candidate lists for a first sub-picture bitstream when performing inter-prediction. However, the motion compensation component 521 may not include motion vectors in the candidate list when the motion vectors are from blocks in another sub-picture bitstream. These restrictions ensure that each sub-picture bitstream can be decoded without reference to a neighbor sub-picture bitstream, and hence resolution based mismatches are avoided.

Further, video coding may employ parallelization, such as WPP, to speed up the video coding process. WPP allows a current block (e.g., CTU) to be coded so long as the block above the current block and the block above and to the right of the current block have already been decoded. WPP creates the impression of a wave, with the top row of blocks being coded two blocks ahead of the second row of blocks, which is two blocks ahead of the third row, etc. Sub-picture bitstream frames can be treated as tiles at the decoder, and the tiles can be merged to reconstruct the spherical video stream. WPP may not be configured to operate when tiles are present, because WPP operates on an entire frame at once (e.g., the frame from the spherical video stream) and not on a tile level. Accordingly, encoder 500 can disable WPP when encoding a sub-picture bitstream. For example, an entropy_coding_sync_enabled_flag is used by WPP. The flag is included in the PPS syntax for each picture. The encoder 500 can set the entropy_coding_sync_enabled_flag to zero to disable WPP for the sub-picture video streams.

Also, the encoder 500 can avoid timing mismatch issues between the sub-picture bitstreams by encoding the sub-picture video streams in tracks and ensuring the tracks have the same presentation time. Further, the encoder 500 can ensure each sample from a common VR picture (e.g., a frame in a spherical video stream) employs the same picture order count value even when such samples are split into different sub-picture bitstreams and/or carried in different tracks.

The encoder 500 can also signal that the abovementioned constraints have been applied to the sub-picture bitstreams, and hence the sub-picture bitstreams can be decoded according to a lightweight merging algorithm. For example, the encoder 500 can employ bitstream syntax to signal a mergable indication indicating that a lightweight merging function can be applied to the sub-picture bitstreams. For example, the encoder 500 can encode various syntax elements into a sub-picture bitstream to indicate to the decoder how the sub-picture bitstream should be decoded. A video bitstream can include a VPS containing information applicable to all layers in a video sequence, a SPS containing information applicable to all pictures in a video sequence, a PPS containing information applicable to all slices of a corresponding picture, etc. The coded blocks representing the image data can then be stored in slices. A video bitstream can also include SEI messages, which are optional messages that contain metadata that is not required for block decoding, but can be employed for related purposes such as indicating picture output timing, display settings, loss detection, loss concealment, etc. The encoder 500 can encode the mergable indication in a corresponding sub-picture bitstream in a VPS, a SPS, a PPS, and/or in an SEI message, depending on the example. For example, the encoder 500 can include the mergable indication in a lightweight merging indication SEI message and/or as a data element in a temporal MCTS SEI message. As another example, the encoder 500 can include the mergable indication can be included in a VPS and/or SPS as VUI. As another specific example, the mergable indication can be included in a VPS and/or SPS in a profile tier level syntax structure, for example as a lightweight merging indication flag between a general profile compatibility flag and a general level idc flag. Hence, the encoder 500 can employ the mergable indication to indicate to the decoder that the corresponding sub-picture bitstreams can be merged into a VR bitstream using a lightweight merging function without altering block coding results for each sub-picture bitstream to account for viewport dependent coding artifacts based on sub-picture bitstream resolution variability.

Figure 6:
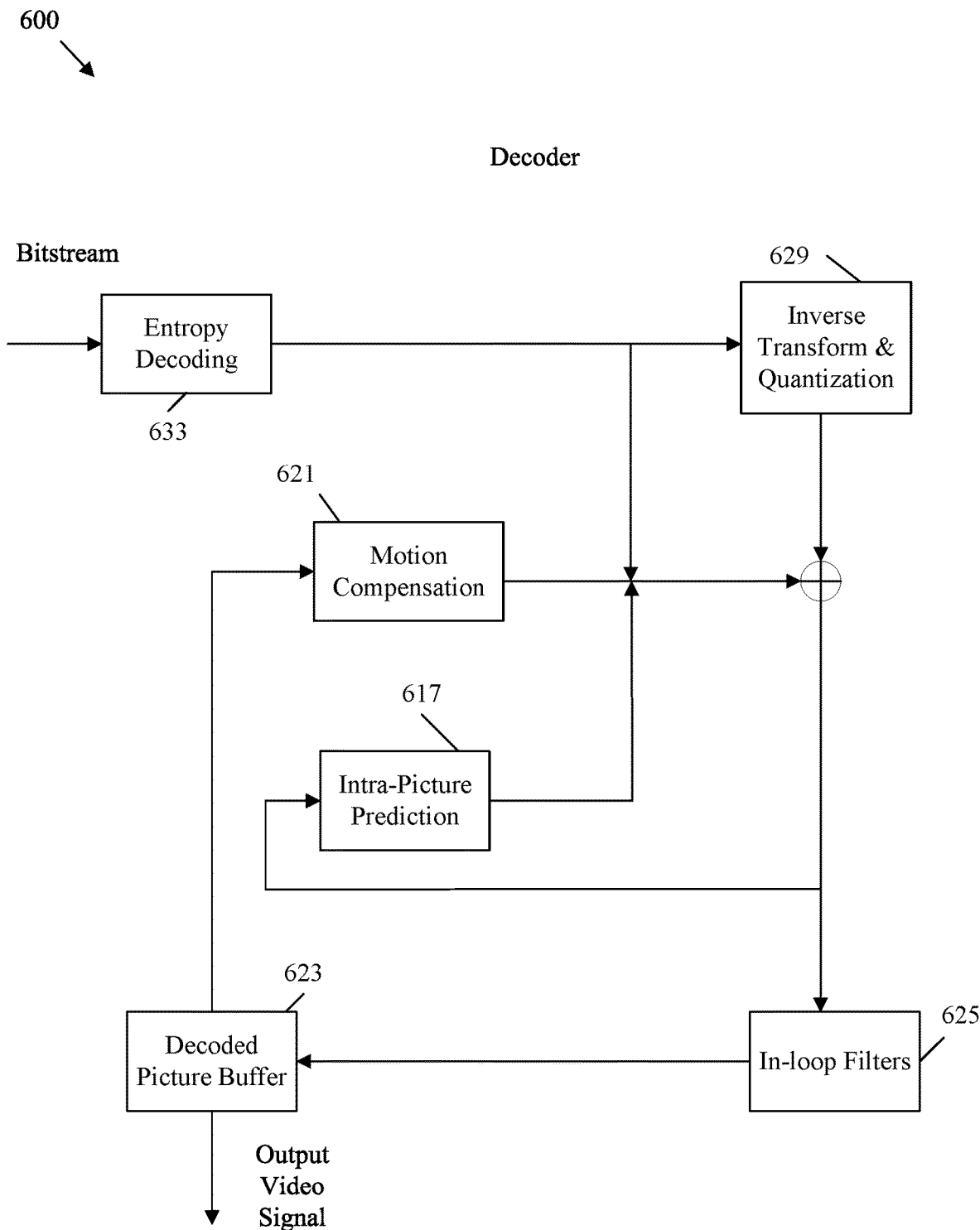
FIG. 6 is a schematic diagram illustrating an example video decoder that may decode sub-picture bitstreams.

FIG. 6 is a block diagram illustrating an example video decoder 600 that may decode sub-picture bitstreams. Video decoder 600 may be employed to implement the decoding functions of codec system 400 and/or implement steps 311, 313, 315, and/or 317 of operating method 300. Further, decoder 600 may be employed to implement steps 211-213 of method 200 as well as decoder 107. Decoder 600 receives a plurality of sub-picture bitstreams, for example from an encoder 500, generates a reconstructed output video signal including sub-picture video streams, merges the sub-picture video streams into a spherical video stream, and forwards the spherical video stream for display to a user via a rendering device.

The bitstreams are received by an entropy decoding component 633. The entropy decoding component 633 is configured to implement an entropy decoding scheme, such as CAVLC, CABAC, SBAC, PIPE coding, or other entropy coding techniques. For example, the entropy decoding component 633 may employ header information to provide a context to interpret additional data encoded as codewords in the bitstreams. The decoded information includes any desired information to decode the video signal, such as general control data, filter control data, partition information, motion data, prediction data, and quantized transform coefficients from residual blocks. The quantized transform coefficients are forwarded to an inverse transform and quantization component 629 for reconstruction into residual blocks. The inverse transform and quantization component 629 may be similar to inverse transform and quantization component 529.

The reconstructed residual blocks and/or prediction blocks are forwarded to intra-picture prediction component 617 for reconstruction into image blocks based on intra-prediction operations. The intra-picture prediction component 617 may be similar to intra-picture estimation component 415 and an intra-picture prediction component 417. Specifically, the intra-picture prediction component 617 employs prediction modes to locate a reference block in the frame and applies a residual block to the result to reconstruct intra-predicted image blocks. The reconstructed intra-predicted image blocks, and/or the residual blocks and corresponding inter-prediction data are forwarded to a decoded picture buffer component 623 via an in-loop filters component 625, which may be substantially similar to decoded picture buffer component 423 and in-loop filters component 425, respectively. The in-loop filters component 625 filters the reconstructed image blocks, residual blocks and/or prediction blocks, and such information is stored in the decoded picture buffer component 623. Reconstructed image blocks from decoded picture buffer component 623 are forwarded to a motion compensation component 621 for inter-prediction. The motion compensation component 621 may be substantially similar to motion estimation component 421 and/or motion compensation component 419. Specifically, the motion compensation component 621 employs motion vectors from a reference block to generate a prediction block and applies a residual block to the result to reconstruct an image block. The resulting reconstructed blocks may also be forwarded via the in-loop filters component 625 to the decoded picture buffer component 623. The decoded picture buffer component 623 continues to store additional reconstructed image blocks, which can be reconstructed into frames via the partition information. Such frames may also be placed in a sequence. The sequence is output toward a display as a reconstructed output video signal.

As noted above, the decoder 600 decodes the sub-picture bitstreams to create sub-picture video streams. The decoder 600 can then employ a lightweight merge algorithm to merge the sub-picture video streams into a spherical video stream for display. The lightweight merge algorithm includes selecting sub-pictures from each sub-picture video stream that occur at a common presentation time, and are hence part of the same spherical frame. The sub-pictures are then merged by positioning each sub-picture based on a position associated with the corresponding sub-picture video stream. The merge algorithm is considered a lightweight algorithm as the approach may not require the decoder 600 to consider dependencies between sub-picture video streams. Instead, each sub-picture video stream can be decoded relatively independently, and the results can be merged (e.g., with some filtering at sub-picture boundaries). Hence, the lightweight merging algorithm may assume the sub-picture bitstreams are self-referenced, and may not change the block level coding results determined for each sub-picture bitstream when merging the sub-pictures together. This lightweight merging algorithm employs reduced processing resources when compared to considering sub-picture bitstream dependencies during decoding. Further, the lightweight merging algorithm can be performed in real-time during display to a user instead of performing such merging in pre-processing prior to display. Hence, the lightweight merging algorithm may make viewport dependent coding possible, as viewport dependent coding is performed in real-time during display to a user. Further, the lightweight merging algorithm can be performed without artifacts due to the encoding constraints employed at the encoder 500 as discussed above. Specifically, the lightweight merging algorithm can be performed as each sub-picture bitstream is encoded in a manner that is self-contained and not dependent on other sub-picture bitstreams.

The decoder 600 can determine to apply the lightweight merging algorithm based on signaling from the encoder 500. For example, the decoder 600 can review bitstream information for a mergable indication, such as in a SEI message, a VPS, and/or an SPS. Upon finding a mergable indication, such as a corresponding syntax element, flag, etc., the decoder 600 can decode the sub-picture bitstreams separately and merge the results into renderable VR frames for display. When the mergable indication is not included, for example the relevant syntax element is set to zero, the decoder 600 can employ a more complex decoding process that affects block level coding, for example by decoding each sub-picture with reference to other sub-pictures regardless of sub-picture bitstream boundaries.

Figure 7:
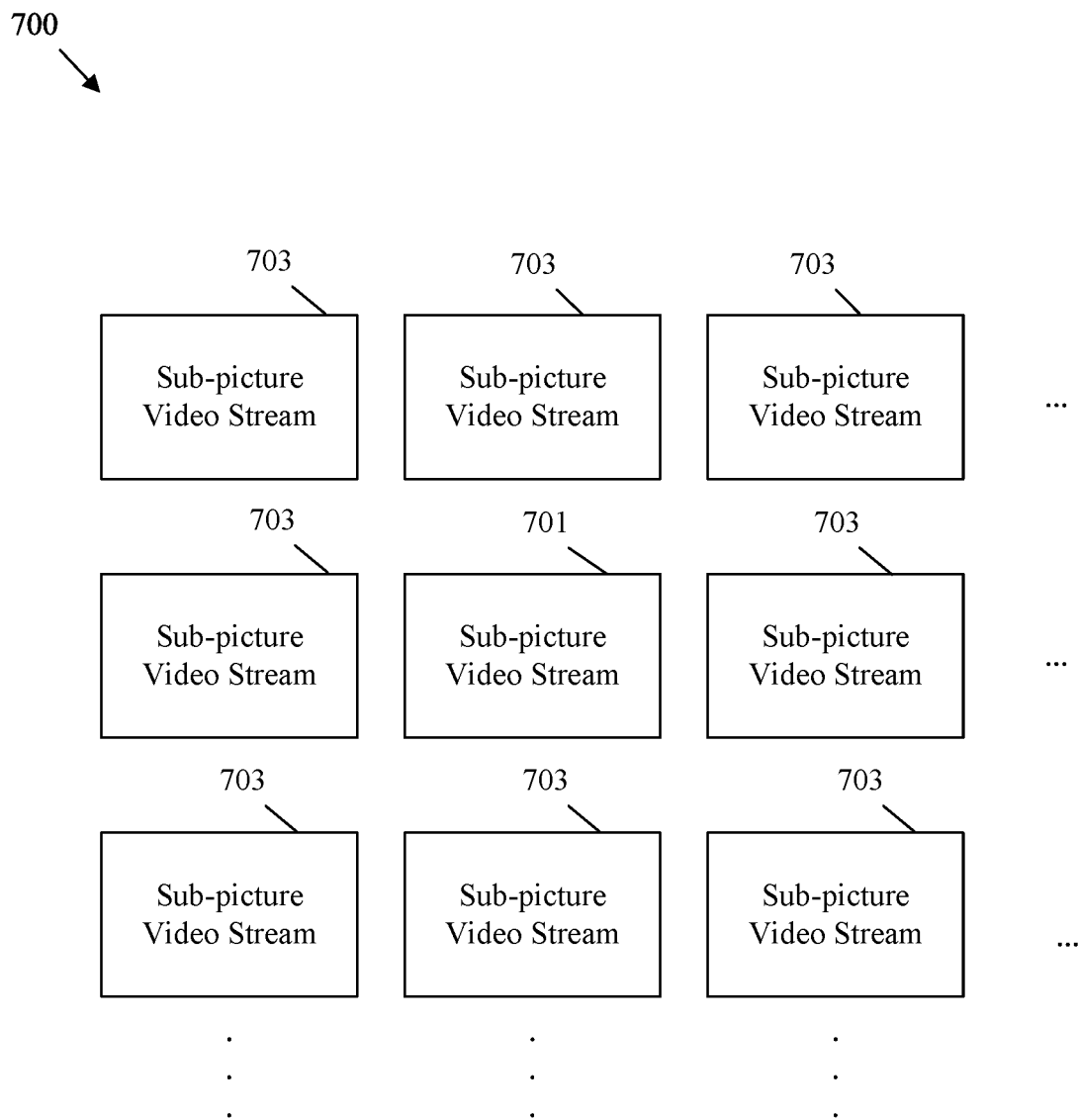
FIG. 7 is a schematic diagram illustrating a plurality of sub-picture video streams split from a VR picture video stream.

The preceding FIGS. describe various components and methods of encoding and decoding sub-picture video streams for use in VR systems. FIG. 7 is presented to illustrate example spatial positioning of sub-picture frames mapped from a spherical frame. Then FIGS. 8-10 describe mechanisms employed in inter-prediction, such as motion vector usage and candidate list generation. These FIGS. are presented to illustrate the problems that can occur when motion vectors cross sub-picture video stream boundaries, as illustrated by FIG. 7, as well as to illustrate constraints that can be applied to mitigate such problems. Then FIGS. 11-14 describe mechanisms for signaling that such constraints have been applied, and hence lightweight merging can be used at the decoder.

FIG. 7 is a schematic diagram illustrating a plurality of sub-picture video streams 701 and 703 split from a VR picture video stream 700. The VR picture video stream 700 can be mapped to the sub-picture video streams 701 and 703 by an encoder 103 and/or VR coding device 104. The sub-picture video streams 701 and 703 can be merged back into the VR picture video stream 700 by a decoder 107. Hence, the VR picture video stream 700 and the sub-picture video streams 701 and 703 illustrate step 205 and step 213 of method 200. The sub-picture video streams 701 and 703 can be encoded and decoded by inter-prediction, for example by motion estimation component 421, motion compensation component 419, motion compensation component 521, and/or motion compensation component 621. The sub-picture video streams 701 and 703 can also be encoded and decoded by intra-prediction, for example by intra-picture estimation component 415, intra-picture prediction component 417, intra-picture prediction component 517, and/or intra-picture prediction component 617. Hence, the sub-picture video streams 701 and 703 can each be encoded and decoded according to method 300.

A VR picture video stream 700 includes a plurality of frames presented over time. The frames of the VR picture video stream 700 can each be sub-divided into sub-frames, also known as sub-pictures. Accordingly, each frame and corresponding sub-frame includes a temporal position (e.g., picture order) as part of the temporal presentation. Sub-picture video streams 701 and 703 are created when the sub-division is applied consistently over time. Such consistent sub-division creates sub-picture video streams 701 and 703 where each stream contains a set of sub-pictures of a predetermined size, shape, and spatial position relative to corresponding frames in the VR picture video stream 700. Further, the set of sub-pictures in a sub-picture video stream 701 and/or 703 varies in temporal position over the presentation time. As such, the sub-pictures of the sub-picture video streams 701 and 703 can be aligned in the time domain based on temporal position. Then the sub-pictures from the sub-picture video streams 701 and 703 at each temporal position can be merged in the spatial domain based on predefined spatial position to reconstruct the VR picture video stream 700 for display.

As used herein sub-picture video streams 701 may be referred to as a first sub-picture video stream (and/or first sub-picture bitstream if in an encoded context). Sub-picture video streams 703 are presented to illustrate neighbor sub-picture video stream (and/or neighbor sub-picture bit-streams) that are adjacent to the first sub-picture video stream 701. Hence, sub-picture video streams 701 and 703 are distinguished for purposes of discussing the various embodiments disclosed herein, and are otherwise substantially similar.

Figure 8:
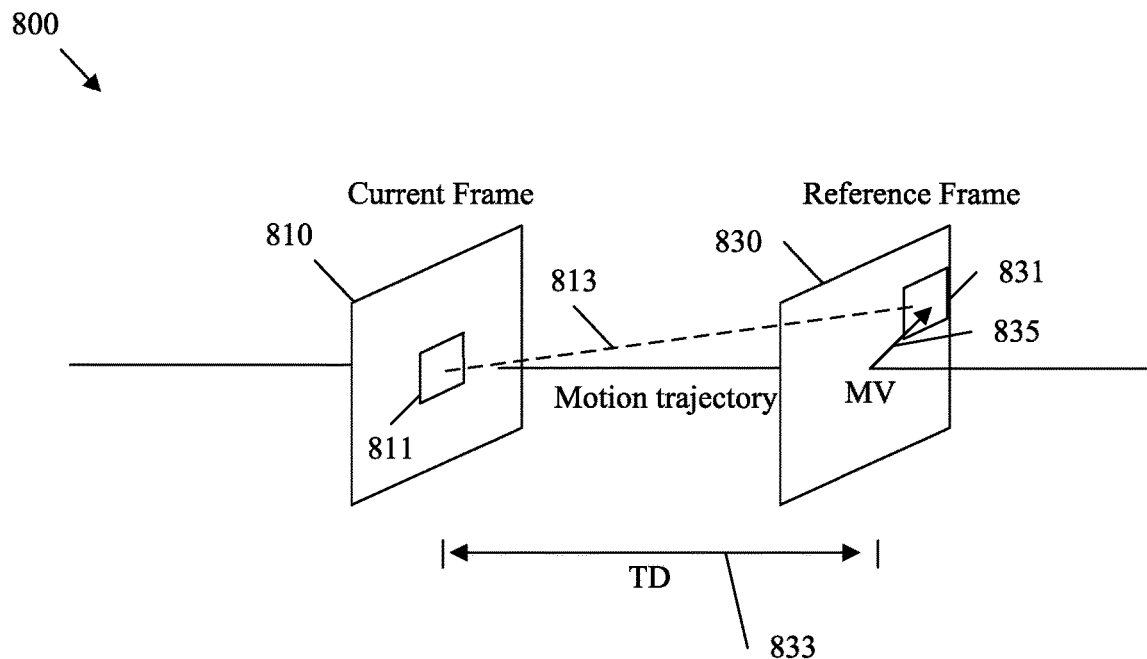
FIG. 8 is a schematic diagram illustrating an example of unidirectional inter-prediction.

FIG. 8 is a schematic diagram illustrating an example of unidirectional inter-prediction 800, for example as performed to determine motion vectors (MVs) at block compression step 305, block decoding step 313, motion estimation component 421, motion compensation component 419, motion compensation component 521, and/or motion compensation component 621. For example, unidirectional inter-prediction 800 can be employed to determine motion vectors for blocks from a sub-picture in a sub-picture video stream 701 and/or 703, and hence can be employed by an encoder 103 and a decoder 107 when performing step 207 and 211, respectively, of method 200.

Unidirectional inter-prediction 800 employs a reference frame 830 with a reference block 831 to predict a current block 811 in a current frame 810. The reference frame 830 may be temporally positioned after the current frame 810 as shown (e.g., as a subsequent reference frame), but may also be temporally positioned before the current frame 810 (e.g., as a preceding reference frame) in some examples. The current frame 810 is an example frame/picture being encoded/decoded at a particular time. The current frame 810 contains an object in the current block 811 that matches an object in the reference block 831 of the reference frame 830. The reference frame 830 is a frame that is employed as a reference for encoding a current frame 810, and a reference block 831 is a block in the reference frame 830 that contains an object also contained in the current block 811 of the current frame 810.

The current block 811 is any coding unit that is being encoded/decoded at a specified point in the coding process. The current block 811 may be an entire partitioned block, or may be a sub-block in the affine inter-prediction case. The current frame 810 is separated from the reference frame 830 by some temporal distance (TD) 833. The TD 833 indicates an amount of time between the current frame 810 and the reference frame 830 in a video sequence, and may be measured in units of frames. The prediction information for the current block 811 may reference the reference frame 830 and/or reference block 831 by a reference index indicating the direction and temporal distance between the frames. Over the time period represented by the TD 833, the object in the current block 811 moves from a position in the current frame 810 to another position in the reference frame 830 (e.g., the position of the reference block 831). For example, the object may move along a motion trajectory 813, which is a direction of movement of an object over time. A motion vector 835 describes the direction and magnitude of the movement of the object along the motion trajectory 813 over the TD 833. Accordingly, an encoded motion vector 835 and a reference block 831 provides information sufficient to reconstruct a current block 811 and position the current block 811 in the current frame 810.

Figure 9:
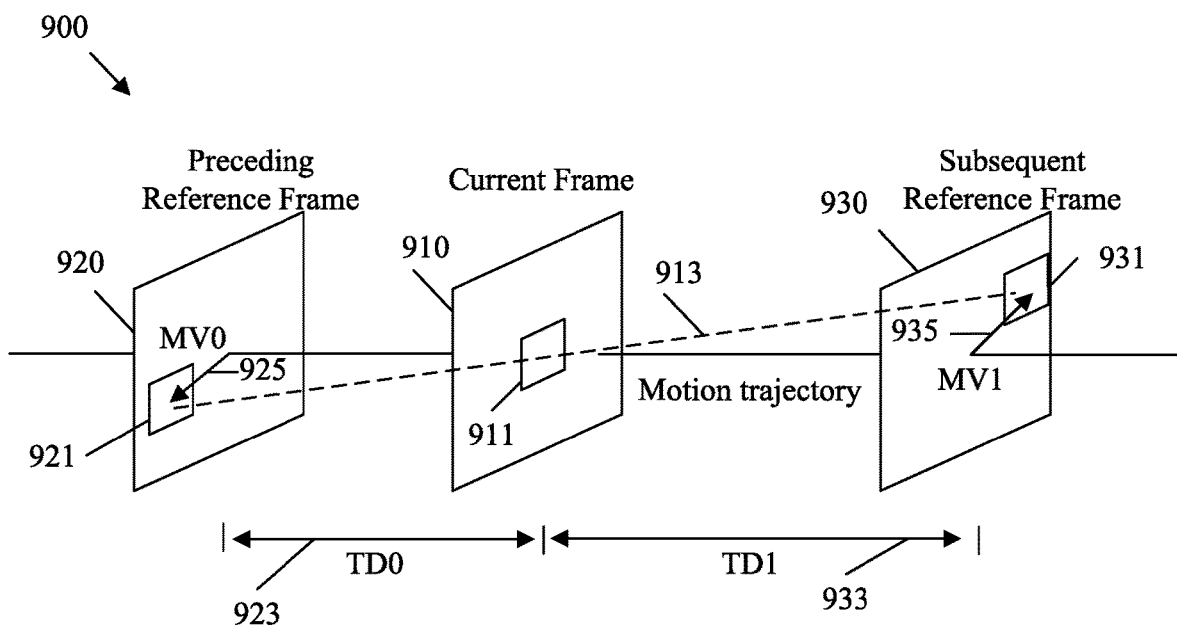
FIG. 9 is a schematic diagram illustrating an example of bidirectional inter-prediction.

FIG. 9 is a schematic diagram illustrating an example of bidirectional inter-prediction 900, for example as performed to determine motion vectors (MVs) at block compression step 305, block decoding step 313, motion estimation component 421, motion compensation component 419, motion compensation component 521, and/or motion compensation component 621. For example, unidirectional inter-prediction 800 can be employed to determine motion vectors for blocks from a sub-picture in a sub-picture video stream 701 and/or 703, and hence can be employed by an encoder 103 and a decoder 107 when performing step 207 and 211, respectively, of method 200. It should be noted that an encoder can select to encode a block according to bidirectional inter-prediction 900 or unidirectional inter-prediction 800 (e.g., as part of RDO) based on which approach provides the best coding efficiency and/or reconstruction quality for the specified block.

Bidirectional inter-prediction 900 is similar to unidirectional inter-prediction 800, but employs a pair of reference frames to predict a current block 911 in a current frame 910. Hence current frame 910 and current block 911 are substantially similar to current frame 810 and current block 811, respectively. The current frame 910 is temporally positioned between a preceding reference frame 920, which occurs before the current frame 910 in the video sequence, and a subsequent reference frame 930, which occurs after the current frame 910 in the video sequence. Preceding reference frame 920 and subsequent reference frame 930 are otherwise substantially similar to reference frame 830.

The current block 911 is matched to a preceding reference block 921 in the preceding reference frame 920 and to a subsequent reference block 931 in the subsequent reference frame 930. Such a match indicates that, over the course of the video sequence, an object moves from a position at the preceding reference block 921 to a position at the subsequent reference block 931 along a motion trajectory 913 and via the current block 911. The current frame 910 is separated from the preceding reference frame 920 by some preceding temporal distance (TD0) 923 and separated from the subsequent reference frame 930 by some subsequent temporal distance (TD1) 933. The TD0 923 indicates an amount of time between the preceding reference frame 920 and the current frame 910 in the video sequence in units of frames. The TD1 933 indicates an amount of time between the current frame 910 and the subsequent reference frame 930 in the video sequence in units of frame. Hence, the object moves from the preceding reference block 921 to the current block 911 along the motion trajectory 913 over a time period indicated by TD0 923. The object also moves from the current block 911 to the subsequent reference block 931 along the motion trajectory 913 over a time period indicated by TD1 933. The prediction information for the current block 911 may reference the preceding reference frame 920 and/or preceding reference block 921 and the subsequent reference frame 930 and/or subsequent reference block 931 by a pair of reference indices indicating the direction and temporal distance between the frames.

A preceding motion vector (MV0) 925 describes the direction and magnitude of the movement of the object along the motion trajectory 913 over the TD0 923 (e.g., between the preceding reference frame 920 and the current frame 910). A subsequent motion vector (MV1) 935 describes the direction and magnitude of the movement of the object along the motion trajectory 913 over the TD1 933 (e.g., between the current frame 910 and the subsequent reference frame 930). As such, in bidirectional inter-prediction 900, the current block 911 can be coded and reconstructed by employing the preceding reference block 921 and/or the subsequent reference block 931, MV0 925, and MV1 935.

As noted above, a block in a sub-picture from a sub-picture video stream 701 and/or 703 can be encoded according to unidirectional inter-prediction 800 and/or bidirectional inter-prediction 900. For example, an object may move over time between a sub-picture video stream 701 and an adjacent sub-picture video stream 703. In such a case, inter-prediction may match samples (e.g., pixels) in a current block in sub-picture video stream 701 with samples in a reference block in the adjacent sub-picture video stream 703. The current block could then be encoded as a motion vector that references the samples in the adjacent sub-picture video stream 703. This approach functions properly so long as both the sub-picture video stream 701 and the sub-picture video stream 703 are decoded at the same resolution. However, in viewport dependent coding, the resolution of sub-picture video stream 703 may be reduced with a lossy process that removes data to further compress the sub-pictures in sub-picture video stream 703. Accordingly, the reference block containing the reference samples may be altered or even removed from the sub-picture in sub-picture video stream 703. In this case, the encoded motion vector may still point to the correct reference block, but the samples contained in the reference block may no longer be accurate for the resolution used by the sub-picture video stream 701. Further, sub-picture video stream 703 may even be completely omitted in some cases, which would result in the motion vector referencing empty data. In any of the above cases, the current block being decoded from the sub-picture video stream 701 is replaced by the lower quality sample, when available, or even expressed in an undefined erroneous manner that depends on the implementation of the decoder. It should be noted that while the present issue is discussed in terms of inter-prediction, the same error could occur in intra-prediction. The only difference is the reference sample in the intra-prediction case occurs at the same temporal position as the current block while the reference sample occurs at a different temporal position than the current block in the inter-prediction case.

In order to avoid these issues, the encoders disclosed herein can be constrained when encoding each sub-picture video stream (e.g., including sub-picture video stream 701 and 703). For example, blocks in a first sub-picture video stream 701 may only be encoded by reference, via motion vector or intra-prediction mode, to full sample locations in the same first sub-picture video stream 701, and hence cannot reference sample locations from other (e.g., adjacent) sub-picture video streams 703. Further, blocks in a first sub-picture video stream 701 can be encoded to reference fractional sample/pixel locations in a sub-picture video stream 701, but only if the sample at the fractional sample location can be recreated by interpolation based solely on sample locations inside the same first sub-picture video stream 701 (e.g., and not in any way reliant on data from the adjacent sub-picture video streams 703). In this manner, samples can be encoded and decoded independently for each sub-picture video streams 701/703 and changes in resolution in an adjacent sub-picture video stream 703 do not affect the first sub-picture video stream 701, and vice versa.

The abovementioned constraints may be enforced in conjunction with certain other constraints to cause a sub-picture video stream 701 and/or 703 to be self-referenced. For example, when a sub-picture video stream 701 is encoded so that inter-prediction and intra-prediction mechanisms do not reference a sample location or a fractional sample location in sub-picture video stream 703, or vice versa, the resulting sub-picture bitstreams can be lightweight merged at the decoder (assuming the other constraints are also met). Hence, when the encoder includes a mergable indication in a sub-picture video stream 701, such as in a SEI message, VPS, SPS, etc., the decoder can determine that the abovementioned sample related constraints have been met and that sub-picture video stream 701 can be merged with other sub-picture bitstreams 703 without modifying block decoding results for sub-picture video stream 701 to account for potential modification of sample data due to lossy coding mechanisms applied to other sub-picture video streams 703.

Figure 10:
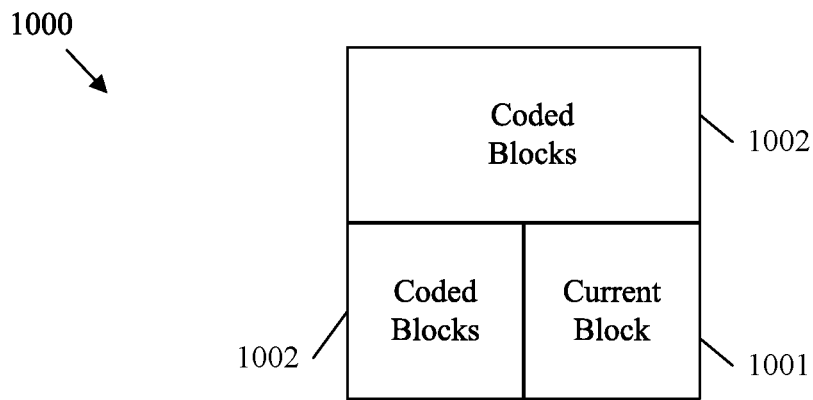
FIG. 10 is a schematic diagram illustrating an example of a block based video coding mechanism.

FIG. 10 is a schematic diagram illustrating an example of a block based video coding mechanism 1000. For example, mechanism 1000 can be used in intra-prediction, unidirectional inter-prediction 800, and/or bidirectional inter-prediction 900. Hence, block based video coding mechanism 1000 can be used to determine intra-prediction modes or motion vectors, depending on the example, at block compression step 305, block decoding step 313, intra-picture estimation component 415, intra-picture prediction component 417, motion estimation component 421, motion compensation component 419, intra-picture prediction component 517, motion compensation component 521, intra-picture prediction component 617, and/or by motion compensation component 621. For example, mechanism 1000 can be employed when encoding blocks from a sub-picture in a sub-picture video stream 701 and/or 703, and hence can be employed by an encoder 103 and a decoder 107 when performing step 207 and 211, respectively, of method 200.

Mechanism 1000 encodes a current block 1001 based on previously coded blocks 1002 in the same frame. In an intra-prediction case, the current block 1001 is matched to samples from the coded blocks 1002. The current block 1001 can then be encoded by an intra-prediction mode that indicates the samples from the coded blocks 1002 that predict the samples in the current block 1001. In the event that a current block 1001 is positioned in a first sub-picture video stream 701 and a coded block 1002 is positioned in an adjacent sub-picture video stream 703, coding errors may occur in viewport dependent coding due to resolution differences. Hence, encoders described herein may be restricted from using intra-prediction modes from a first sub-picture video stream 701 that rely on samples from an adjacent sub-picture video stream 703.

Mechanism 1000 can also be used in certain types of inter-prediction. Specifically, inter-prediction may employ various modes such as merge mode and AMVP mode. In both modes, the motion vector for a current block 1001 can be selected based on motion vectors from the coded blocks 1002. In merge mode, the motion vectors selected from the coded blocks 1002 can be included in a candidate list. The candidate list may also include motion vectors indicating no movement, motion vectors from temporally adjacent blocks in preceding and/or subsequent frames, motion vectors that have been used repeatedly for previously coded blocks, etc. The motion vector for the current block 1001 is then selected from the candidate list. The motion vector for the current block 1001 can then be signaled as a candidate list index. This allows a current block 1001 to be encoded by a single index value. The decoder can generate the candidate list for the current block 1001 by using the same process as the encoder, and can then determine the motion vector for the current block 1001 based on the candidate list index. AMVP mode is similar to merge mode, but can be employed when none of the motion vectors in the candidate list represent the correct motion vector for the current block 1001. In this case, AMVP mode can select the motion vector from the candidate list that most closely matches the correct motion vector for the current block 1001. AMVP mode then encodes both the candidate list index of the selected motion vector candidate as well as a value indicating the difference between the selected motion vector candidate and the correct motion vector for the current block.

Both merge mode and AMVP mode can cause errors in viewport dependent coding when the current block 1001 is positioned in a first sub-picture video stream 701 and the coded block 1002 is positioned in an adjacent sub-picture video stream 703. For example, when the resolution for the adjacent sub-picture video stream 703 is reduced, the motion vector for the coded block 1002 in the adjacent sub-picture video stream 703 may change. This would result in the candidate list generated for the current block 1001 at the decoder referencing motion vectors that have been altered due to resolution changes. However, the candidate list generated by the encoder is generated when both the current block 1001 and the coded block 1002 share the same resolution. Hence, the candidate lists no longer match in this case. When the candidate lists do not match, the index can point to the wrong motion vector candidate at the decoder. This can result in the decoder selecting the wrong reference block for the current block 1001, and hence displaying the wrong sample values for the current block 1001.

In order to overcome these issues, the encoders disclosed herein may be restricted so that motion vectors candidate lists for a current block 1001 in a first sub-picture video stream 701 do not include motion vectors from coded blocks 1002 in neighbor sub-picture bitstreams 703. For example, during candidate list generation such motion vectors from other neighbor sub-picture bitstreams 703 are not added to the candidate list, and hence cannot be selected by AMVP mode or merge mode when performing inter-prediction. This restriction, in conjunction to the restriction preventing referencing samples in other sub-picture bitstreams 703, ensures that each sub-picture bitstream 701 can be decoded without reference to a neighbor sub-picture bitstream 703, and hence resolution based mismatches are avoided.

As with the previously discussed sample related constraints, the encoder can apply the abovementioned motion vector candidate list constraints to ensure that a sub-picture video stream 701 and/or 703 are self-referenced and hence can be merged. Accordingly, when the encoder includes a mergable indication in the sub-picture video stream 701, such as in an SEI message, a VPS, a SPS, etc., the decoder can determine that the abovementioned motion vector candidate list constraints have been met and that sub-picture video stream 701 can be merged with other sub-picture bitstreams 703 without modifying block decoding results for sub-picture video stream 701 to account for potential modification of motion vector data due to lossy coding mechanisms applied to other sub-picture video streams 703.

Another source of potential error in viewport dependent coding is that picture order count and/or presentation time data may change between resolutions. Picture order count data indicates an order of a frame in a media segment, and hence can be used by the decoder to position frames in media segments into the proper sequence for display. The media presentation time data indicates the length of time over which a media segment should be displayed, for example based on picture order count, frame rate, etc. As this data is specific to a sub-picture video stream, resolution related changes that affect frame rate, picture order count, presentation time, etc. could cause spatial sections of a VR video to be displayed out of order. For example, different sub-picture portions of the spherical video frame could be shown at different rates, which would cause the user to view portions of the VR video out of order with other portions of the VR video in the same VR frame.

In order to mitigate such timing mismatch issues, the encoders herein may be constrained to ensure each track has the same presentation time regardless of resolution. Further, each track containing a sub-picture bitstream can be constrained to include the same number of media samples (e.g., the same number of total frames). In addition, the media samples for each track segment that are associated with the same VR frame may use the same picture order count value. This may be maintained even when such sub-pictures are split into different sub-picture bitstreams and/or carried in different tracks. When these constraints are enforced, the sub-pictures are displayed at the same order and rate regardless of resolution. Hence, different resolutions can be mixed into a single spherical video stream without producing timing errors.

As with the previously discussed sample and motion vector candidate list related constraints, the encoder can apply the abovementioned timing constraints to ensure that a sub-picture video stream 701 and/or 703 align in the time domain and hence can be merged based on frame count and spatial position. Accordingly, when the encoder includes a mergable indication in the sub-picture video stream 701, in an SEI message, a VPS, a SPS, etc., the decoder can determine that the abovementioned timing constraints have been met and that sub-picture video stream 701 can be merged with other sub-picture bitstreams 703 without modifying block decoding results for sub-picture video stream 701 to account for potential modification of block coding results due to out of order sub-picture frames with respect to other sub-picture video streams 703.

In addition, as discussed above, WPP can alter the way blocks are decoded by altering decoding order. This may cause errors when applied to multiple sub-pictures combined from multiple tracks into a single frame of a VR based spherical video stream. The encoders disclosed herein may disable WPP by altering data in a PPS for each sub-picture. For example, an entropy_coding_sync_enabled_flag in each PPS may be set to zero to disable WPP for the sub-picture video streams. In some examples, WPP related data is stored in-band by including the WPP related data in the media samples. In other examples, such data may be stored in track or track fragment boxes. In some examples, when the encoder includes a mergable indication in in a sub-picture video stream 701, the decoder can determine that WPP has been disabled in corresponding PPS data.

Figure 11:
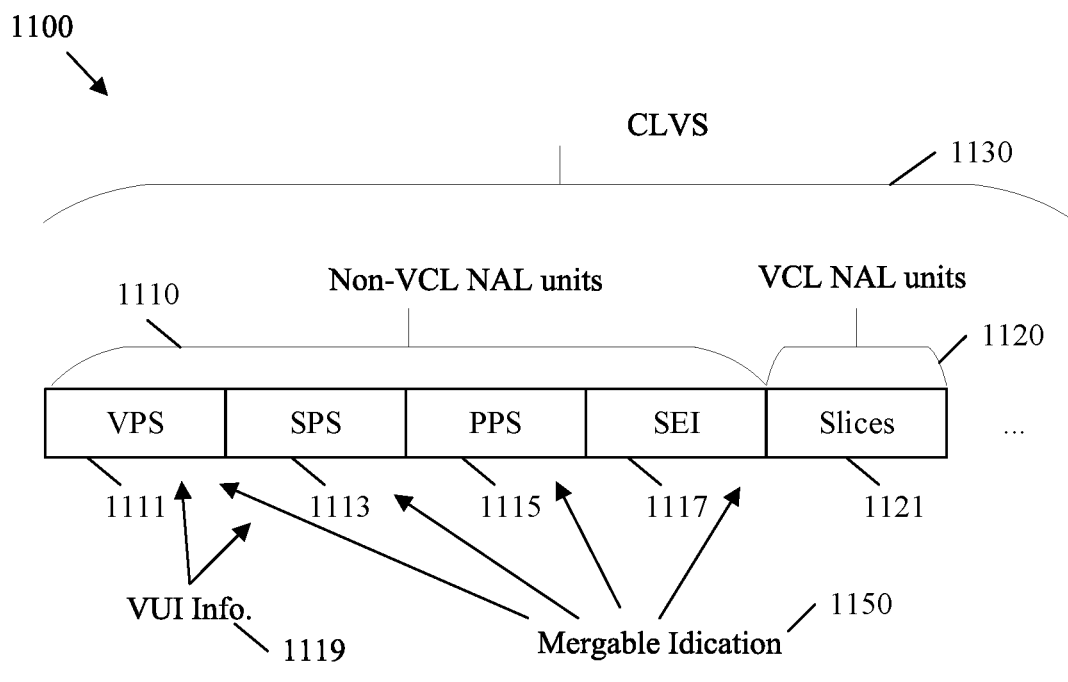
FIG. 11 is a schematic diagram illustrating an example bitstream for transporting a video coding.

FIG. 11 is a schematic diagram illustrating an example bitstream 1100 for transporting a video coding. For example, a video coding generated by encoder 103, codec system 400, and/or encoder 500 can be stored in a bitstream 1100 for decoding by a decoder 107, codec system 400, and/or decoder 600. Hence, the bitstream 1100 can be employed to store and transmit data in methods 200 and 300. Further, the results of unidirectional inter-prediction 800, and/or bidirectional inter-prediction 900, and mechanism 1000, as applied to a sub-picture in a sub-picture video stream 701 and/or 703, can be stored in bitstream 1100.

The bitstream 1100 may include one or more coded layerwise video sequences (CLVSs) 1130. A CLVS 1130 is a sequence of pictures/frames of a predetermined temporal distance encoded as multiple layers. Specifically, a video sequence can be scalable between frame rates by employing a plurality of layers. A base layer may contain all of the frames in the sequence, a first enhancement layer may contain a sub-portion (e.g., half) of the base layer of frames (e.g., for half the base frame rate), a second enhancement layer may contain a sub-portion (e.g., half) of the frames from the first enhancement layer (e.g., for one quarter the base frame rate), etc. Accordingly, CLVS 1130 may contain multiple layers of pictures, and the video frame rate can be adjusted by displaying only pictures associated with a corresponding layer. It should be noted that encoding as a CLVS 1130 with multiple layers is optional. When a video sequence is not encoded in multiple layers (e.g., a single layer and a single frame rate is supported), the CLVS 1130 is instead referred to as a coded video sequence (CVS). A CLVS 1130 extends for a predetermined temporal distance, and hence includes a video segment. For example, a first CLVS 1130 may contain a first scene, a second CLVS 1130 may contain a second scene, etc. Hence, a CLVS 1130 can extend until a breakpoint before another CLVS 1130 begins, which allows for searching between scenes, cuts for commercials, etc. A CLVS 1130 can be further sub-divided into access units, where an access unit contains the relevant information for decoding a corresponding picture or sub-picture, depending on the example.

A CLVS 1130 contains a plurality of network abstraction layer (NAL) units. For example, the NAL units associated with a common picture/sub-picture make up an access unit. NAL units can be sub-divided into video coding layer (VCL) NAL units 1120 that contain encoded video data (e.g., coded blocks) and non-VCL NAL units 1110 that contain syntax or other supporting data used to properly display/render the data from the VCL NAL units 1120. The VCL NAL units 1120 contain coded blocks (e.g., prediction units, transform data, etc.) organized into slices 1121. The VCL NAL units 1120 can also contain slice headers. A slice 1121 is a sub-set of a picture and/or sub-picture and hence contains the coded blocks for the corresponding picture/sub-picture.

The non-VCL NAL units 1110 can contain a VPS 1111, a SPS 1113, a PPS 1115, and optionally on or more SEI messages 1117. The VPS 1111 contains information related to the CLVS 1130 layers, such as data related to layer scalability (e.g., frame rates), layer picture order data, layer identifiers, layer relationships, layer timing information, etc. The SPS 1113 contains sequence data common to all the pictures in the video sequence contained in the bitstream. Such data can include picture sizing, bit depth, coding tool parameters, bit rate restrictions, etc. The VPS 1111 and/or SPS 1113 may contain VUI 1119. VUI 1119 is optional information that describes the mechanisms for displaying of the pictures contained in the slices 1121 (e.g., aspect ratio, overscan data, color primaries, etc.) and/or timing information for the bitstream 1100.

The PPS 1115 contains parameters that are specific to each picture. Accordingly, a bitstream 1100 can contain a single VPS 1111 and a single SPS 1113, but can contain a PPS 1115 for each picture/sub-picture. The PPS 1115 can indicate coding tools available for slices 1121 in corresponding pictures, quantization parameters, offsets, picture specific coding tool parameters (e.g., filter controls), etc. The SEI messages 1117 are optional, and hence the CLVS 1130 can contain zero or more SEI messages 1117 per segment. The SEI messages 1117 include metadata relevant to the CLVS 1130. An SEI message 1117 can apply to a current access unit or can persist until canceled or replaced by another SEI message 1117. A broad range of SEI messages 1117 can be employed in a CLVS 1130, and such SEI messages 1117 may contain a broad range of data. An SEI message 1117 can include data describing appropriate mechanisms to display pictures/sub-pictures contained in slices 1121, but may not include data relating to decoding such slices 1121 (e.g., which may be contained in SPS 1113, PPS 1115, and/or slice headers). For example, SEI message 1117 may contain pointers to active parameter sets, scene information, picture orientation data, picture pattern information, filter information, etc. It should be noted that data in SEI messages 1117 may be complementary and/or overlapping with VUI 1119 data.

The bitstream 1100 can contain a sub-picture bitstream by including block coding information in the VCL NAL units 1120 and corresponding syntax in the non-VCL NAL units 1110. When encoding the bitstream 1100, the encoder can enforce the constraints discussed above to ensure that the sub-picture bitstream is self-referenced. The encoder can also include a mergable indication 1150 in the bitstream 1100 to indicate to the decoder that the bitstream 1100 is self-referenced. Hence, the mergable indication 1150 indicates to the decoder that the sub-picture bitstream contained in bitstream 1100 can be merged with other sub-picture bitstreams via a multi-bitstream merge function, such as a lightweight merging function, by merging the sub-pictures based on spatial position without making changes to the block coding results created by decoding the slices 1121.

In some examples, the mergable indication 1150 can be included in one or more SEI messages 1117. For example, the SEI messages 1117 can include a lightweight merging indication SEI message to contain the mergable indication 1150. In this example, the lightweight merging indication SEI message 1117 is used to indicate whether the bitstream 1100 is constrained in a way such that it can be lightweight merged/rewritten with other bitstreams into one conforming video bitstream without unexpected artifacts. In this example, the syntax and semantics of the SEI message 1117 is as follows:

| lightweight_merging_indication(payloadSize) { } | Descriptor |
|---|---|

When a lightweight merging indication SEI message 1117 is present for any picture of a CLVS 1130, the lightweight merging indication SEI message 1117 may be present for the first picture of the CLVS 1130. The presence of the lightweight merging indication SEI message 1117 in a CLVS 1130 may indicate that the following constraints apply for each picture of the CLVS 1130. There shall be no sample values outside the picture that are referenced for inter-prediction. Also, for prediction units located on the right-side picture boundary except the last one at the bottom-right corner of the picture, the following applies when CuPredMode[xPb][yPb] is equal to MODE_INTER, where (xPb, yPb) specifies the top-left sample of the corresponding luma prediction block relative to the top-left sample of the current picture. Further, the number of spatial merging candidates, numSpatialMergeCand is derived as follows:

numSpatialMergeCand=availableFlagA0+availableFlagA1+availableFlagB0+availableFlagB1+availableFlagB2 where availableFlagA0, availableFlagA1, availableFlagB0, availableFlagB1, and availableFlagB2 are the output of the derivation process for spatial merging candidates. The following also applies. If numSpatialMergeCand is equal to zero, merge_flag[xPb][yPb] shall be equal to zero. Otherwise (numSpatialMergeCand is greater than zero), merge idx[xPb][yPb] shall be in the range of 0 to numSpatialMergeCand −1, inclusive. In addition, the number of spatial motion vector predictor candidates numSpatialMvpCand is derived as follows:

```
if ( availableFlagLXA )
    numSpatialMvpCand = availableFlagLXA +
        ( ( mvLXA != mvLXB ) ? availableFlagLXB : 0 )
else
    numSpatialMvpCand = availableFlagLXB
``` where availableFlagLXA, availableFlagLXB, mvLXA, and mvLXB are the output of the derivation process for motion vector predictor candidates from neighbouring prediction unit partitions. The following may also apply. If numSpatialMvpCand is equal to zero, mvp_10_flag[xPb][yPb] and mvp_11_flag[xPb][yPb] shall be equal to one. Otherwise (numSpatialMvpCand is greater than zero), mvp_10_flag[xPb][yPb] and mvp_11_flag[xPb][yPb] shall be in the range of zero to numSpatialMvpCand −1, inclusive. The first constraint restricts such that motion vectors point either to full-sample locations inside the picture or to fractional-sample locations that require only full-sample locations inside the picture for interpolation. The second constraint restricts that, when the bitstream 1100 is merged with other bitstreams into one conforming bitstream in a fashion where block-level coding results remain unchanged, in decoding of the entire merged bitstream, for blocks of the sub-picture corresponding to this bitstream 1100, there won't be motion vector candidates for temporal motion vector prediction derived from blocks outside the sub-picture.

In some examples, in addition to the constraints as specified above, the presence of the lightweight merging indication SEI message 1117 in a CLVS 1130 indicates that additionally the following constraint applies for each picture of the CLVS 1130. The value of entropy_coding_sync_enabled_flag in the active PPS 1115 shall be equal to 0.

In another example, the SEI messages 1117 can include a temporal MCTS SEI message 1117 that contains the mergable indication 1150. A MCTS SEI message 1117 is used to support usage of MCTS tiles. High Efficiency Video Coding (HEVC) allows for the use of MCTS tiles, which are a set of tiles in a picture that are coded such that motion vectors for each tile point only to full sample locations within the same tile or partial locations that can be reconstructed based on interpolation from sample locations within the tile, and such that candidate motion vectors are only allowed from within the tile. A MCTS SEI message 1117 can be employed to indicate parameters associated with MCTS tiles. Sub-picture bitstreams may not employ MCTS tiles (e.g., or may employ a single MCTS tile for the entire spherical video stream). However, a temporal MCTS SEI message 1117 can still be employed despite the inclusion of a single MCTS tile in the frame(s) of the multi-directional video streams taken from the spherical video stream. As a specific example, SEI messages 1117 can include a MCTS SEI message 1117 that further includes a each_tile_one_tile set_flag, which can be set to indicate that sub-picture bitstreams can be merged via a lightweight merging function. In a specific example, this can be done by changing the HEVC semantics of the MCTS SEI message 1117 as follows. First, the following constraint is removed from the semantics of the temporal MCTSs SEI message: The temporal motion-constrained tile sets SEI message applicable to targetLayerId shall not be present for any picture in associatedPicSet when tiles enabled_flag is equal to zero for any PPS that is active for any picture in associatedPicSet. Second, when a tiles_enabled flag is equal to zero, e.g., there is only one tile in each picture, a temporal MCTSs SEI message that has each_tile_one_tile_set_flag equal to one can be used to indicate whether for the pictures associated with the temporal MCTSs SEI message the above constraints (as indicated by the lightweight merging indication SEI message) apply.

In another example, HVEC can be altered by replacing a statement that the temporal motion-constrained tile sets SEI message applicable to targetLayerId shall not be present for any picture in associatedPicSet when tiles_enabled_flag is equal to 0 for any PPS that is active for any picture in associatedPicSet with the following. When the temporal motion-constrained tile sets SEI message applicable to targetLayerId is present for any picture in associatedPicSet when tiles_enabled_flag is equal to 0 for any PPS that is active for any picture in associatedPicSet, the picture contains only one tile, which forms the only MCTS, and the value of each_tile_one_tile set_flag shall be equal to 1.

In another example, a syntax element, such as a flag in the VUI 1119 of the SPS 1113 or the VPS 1111 and/or a flag in the PPS 1115, can be used as a mergable indication 1150, and hence to indicate whether the above constraints (e.g., that the bitstream 1100 is self-referenced) apply for the pictures referring to the SPS 1113 or VPS 1111, respectively.

For example, the VUI 1119 may contain a series of syntax elements. One of the bits between the syntax elements general_profile_compatibility_flag[31] and general_level_idc flag in the profile_ tier_level( )) in the syntax structure can be used to indicate whether the above constraints (e.g., that the bitstream 1100 is self-referenced) apply for the pictures referring to the SPS 1113 or VPS 1111, respectively.

Figure 12:
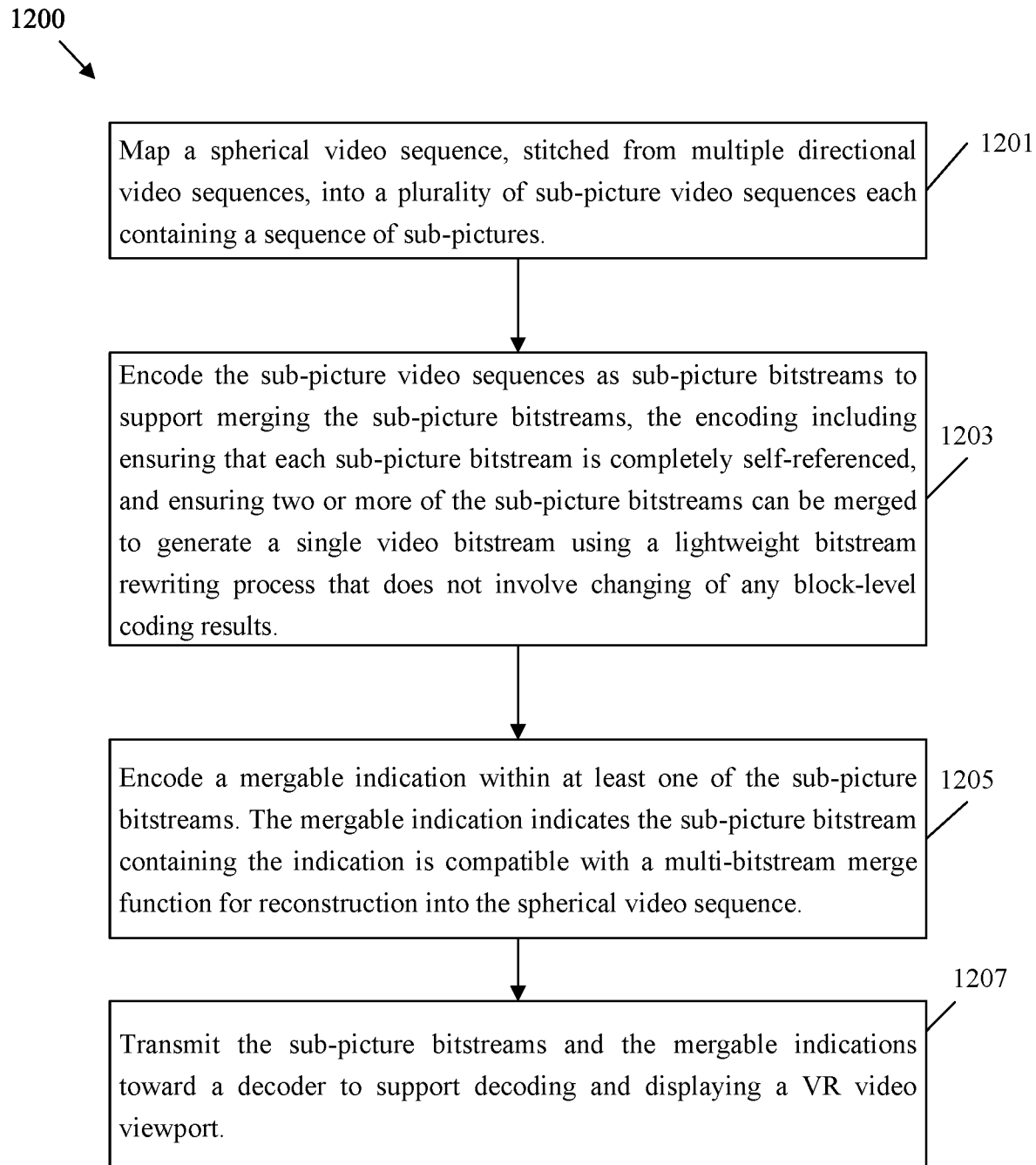
FIG. 12 is a flowchart of an example method of bitstream level signaling to indicate that sub-picture bitstreams are mergable via a multi-bitstream merge function.

FIG. 12 is a flowchart of an example method 1200 of bitstream level signaling to indicate that sub-picture bitstreams, such as sub-picture video streams 701 and 703 split from a spherical video stream for use as a VR video stream, are mergable via a multi-bitstream merge function. Method 1200 includes a mergable indication in a bitstream 1100, such as in a VPS 1111, a SPS 1113, and/or a SEI message 1117. Method 1200 can be employed by an encoder, such as encoder 103, codec system 400, and/or encoder 500, to indicate to a decoder, such as decoder 107, codec system 400, and/or decoder 600 that sub-picture bitstreams can be merged. Further, method 1200 can be employed to implement viewport dependent coding to support methods 200 and 300. Also, method 1200 may be employed to indicate that unidirectional inter-prediction 800, bidirectional inter-prediction 900, and/or mechanism 1000 have been constrained so that sub-picture bitstreams can be merged as part of viewport dependent coding mechanisms without creating visual artifacts due to sub-picture video stream boundaries.

At step 1201, a spherical video sequence is mapped into a plurality of sub-picture video sequences. As noted above, the spherical video sequence is stitched from multiple directional video sequences captured by a multi-directional camera. Each sub-picture video stream contains a sequence of sub-pictures (also referred to herein as sub-frames).

At step 1203, the plurality of sub-picture video sequences are encoded as sub-picture bitstreams in corresponding tracks. The tracks can be employed to support merging of the plurality of sub-picture bitstreams at a decoder to reconstruct the spherical video sequence. The sub-picture bitstreams are encoded by employing the constraints discussed above to ensure that each sub-picture bitstream is completely self-referenced. Specifically, such sub-picture bitstreams are encoded so that inter-prediction and intra-prediction mechanisms do not reference sample locations or fractional sample locations in neighbor sub-bitstreams, and further do not contain motion vector candidate lists that employ motion vector candidates from neighbor sub-bitstreams. Accordingly, step 1203 ensures two or more of the sub-picture bitstreams can be merged to generate a single video bitstream for the spherical video sequence by using a lightweight bitstream rewriting process that does not involve changing of any block-level coding results.

At step 1205, a mergable indication is encoded within at least one of the sub-picture bitstreams. The mergable indication indicates that the sub-picture bitstream containing the mergable indication is compatible with a multi-bitstream merge function, such as a lightweight merge function, for reconstruction into the spherical video sequence or a part thereof. Specifically, the multi-bitstream merge function merges sub-picture bitstreams based on spatial position without changing block level coding results from the sub-picture bitstreams. In some examples, the mergable indication is included in a SEI message, such as a lightweight merging indication SEI message and/or a temporal MCTS SEI message. For example, a temporal MCTS SEI message can be used to contain a mergable indication despite inclusion of a single tile (e.g. an MCTS tile) in the picture(s) of the spherical video sequence. As a specific example, the mergable indication can be an each_tile_one_tile_set_flag that may be set to one. In either case, the SEI message may further indicate that waveform parallel processing is disabled by setting an entropy_coding_sync_enabled_flag to zero in PPS for each track including the sub-picture bitstreams. In other examples, the mergable indication can be included as a syntax element in a VPS and/or an SPS. For example, the mergable indication can be included as VUI in the VPS and/or the SPS. As a specific example, the mergable indication can be included in VUI between a set of general profile compatibility flags and a general level idc flag in a profile tier level syntax structure.

At step 1207, a set of the sub-picture bitstreams and the mergable indication(s) are transmitted toward a decoder to support decoding and displaying a viewport dependent virtual reality video sequence on a virtual reality video viewport by employing a lightweight merge function.

Figure 13:
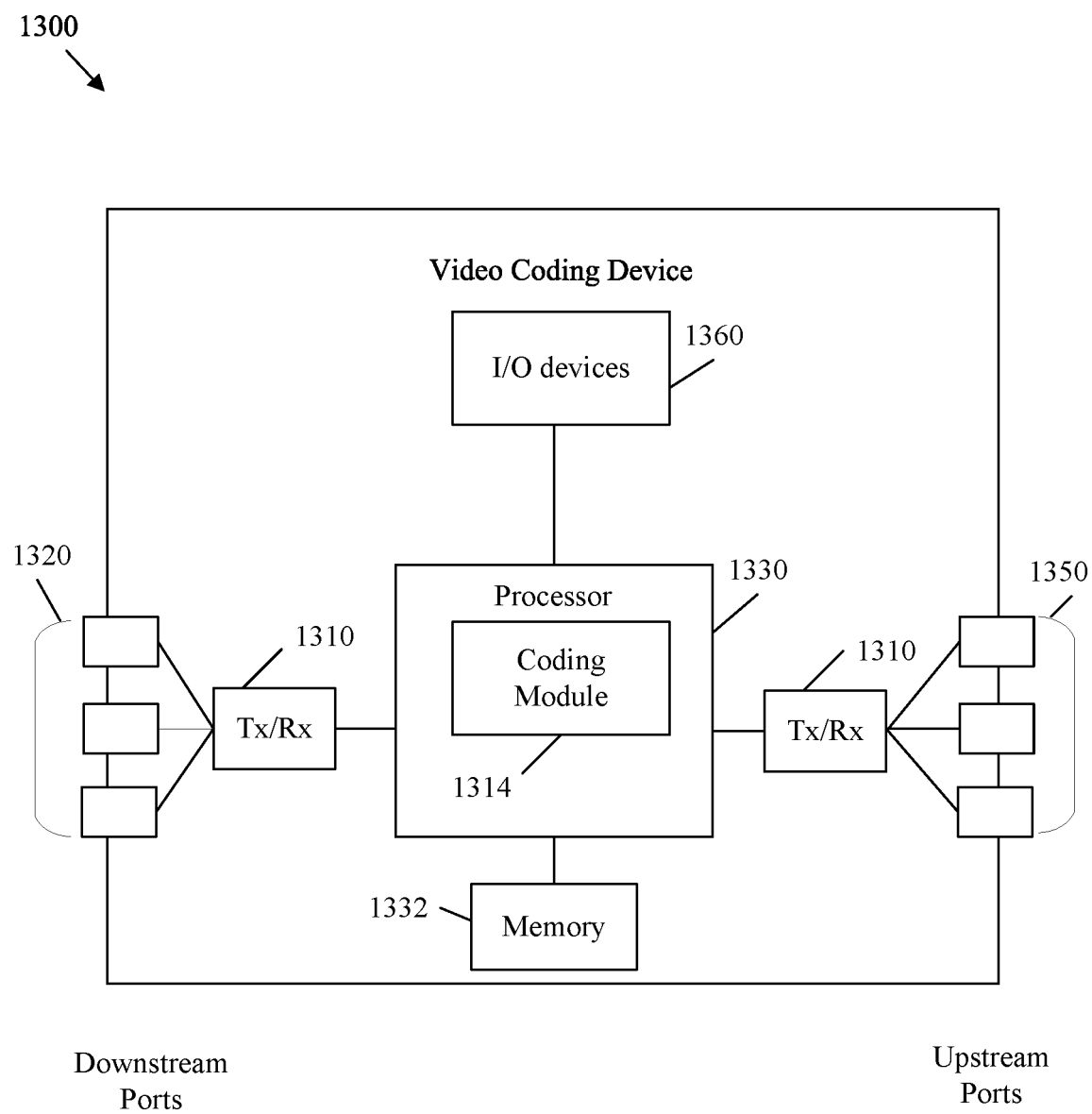
FIG. 13 is a schematic diagram of an example video coding device.

FIG. 13 is a schematic diagram of an example video coding device 1300. The video coding device 1300 is suitable for implementing the disclosed examples/embodiments as described herein. The video coding device 1300 comprises downstream ports 1320, upstream ports 1350, and/or transceiver units (Tx/Rx) 1310, including transmitters and/or receivers for communicating data upstream and/or downstream over a network. The video coding device 1300 also includes a processor 1330 including a logic unit and/or central processing unit (CPU) to process the data and a memory 1332 for storing the data. The video coding device 1300 may also comprise optical-to-electrical (OE) components, electrical-to-optical (EO) components, and/or wireless communication components coupled to the upstream ports 1350 and/or downstream ports 1320 for communication of data via optical or wireless communication networks. The video coding device 1300 may also include input and/or output (I/O) devices 1360 for communicating data to and from a user. The I/O devices 1360 may include output devices such as a display for displaying video data, speakers for outputting audio data, etc. The I/O devices 1360 may also include input devices, such as a keyboard, mouse, trackball, etc., and/or corresponding interfaces for interacting with such output devices.

The processor 1330 is implemented by hardware and software. The processor 1330 may be implemented as one or more CPU chips, cores (e.g., as a multi-core processor), field-programmable gate arrays (FPGAs), application specific integrated circuits (ASICs), and digital signal processors (DSPs). The processor 1330 is in communication with the downstream ports 1320, Tx/Rx 1310, upstream ports 1350, and memory 1332. The processor 1330 comprises a coding module 1314. The coding module 1314 implements the disclosed embodiments described above, such as methods 200, 300, 1200, and/or combinations thereof. For example, the coding module 1314 can implement an encoder, such as encoder 103, codec system 400, and/or encoder 500, in order to encode the sub-picture video streams, such as sub-picture video streams 701 and 703, via viewport dependent coding. As another example, the coding module 1314 can implement a decoder, such as decoder 107, codec system 400, and/or decoder 600 for decoding the sub-picture video streams. The coding module 1314 may encode/decode such sub-picture video streams in a bitstream 1100. Further, the coding module 1314 may employ unidirectional inter-prediction 800, bidirectional inter-prediction 900, and/or mechanism 1000 in viewport dependent coding without creating visual artifacts due to sub-picture video stream boundaries.

Specifically, the coding module 1314 can encode and/or decode sub-picture video streams according to constraints to prevent visual artifacts. For example, coding module 1314 can encode sub-picture video streams so that blocks only reference full sample locations in the same sub-picture video stream, and hence cannot reference sample locations from other sub-picture video streams. Coding module 1314 can encode blocks using fractional sample locations in a sub-picture video stream, but only if the sample at the fractional sample location can be recreated by interpolation based solely on sample locations inside the same sub-picture bitstream. Further, coding module 1314 can ensure motion vectors from blocks in adjacent sub-picture bitstreams are not included in motion vector candidate lists. The coding module 1314 can apply these restrictions to ensure that each sub-picture bitstream can be decoded without reference to a neighbor sub-picture bitstream, and hence resolution based mismatches are avoided. The coding module 1314 can also turn off WPP, for example by setting an entropy_coding_sync_enabled_flag in each PPS to zero. Also, coding module 1314 can prevent timing mismatches between the sub-picture bitstreams by ensuring tracks containing the sub-picture video streams have the same presentation time, ensuring tracks have the same number of media samples (e.g., frames), and ensuring each sample from a common VR picture employs the same picture order count value. The coding module 1314 can also include a mergable indication to indicate that a sub-picture bitstream is self-referenced and hence can be merged with other sub-picture bitstreams without changing block level coding results. The mergable indication can be included in an SEI message, a VPS, and/or a PPS. Hence, coding module 1314 causes the video coding device 1300 to operate with greater coding efficiency and/or by using fewer network resources by employing viewport dependent coding without creating visual artifacts and/or sacrificing visual quality of the VR video stream displayed to a user via a rendering device. Further, the coding module 1314 allows a decoder to operate a with greater efficiency by employing a merge function without a altering block level results related to sub-picture bitstream/video stream resolution differences. As such, coding module 1314 improves the functionality of the video coding device 1300 as well as addresses problems that are specific to the video coding arts. Further, coding module 1314 effects a transformation of the video coding device 1300 to a different state. Alternatively, the coding module 1314 can be implemented as instructions stored in the memory 1332 and executed by the processor 1330 (e.g., as a computer program product stored on a non-transitory medium).

The memory 1332 comprises one or more memory types such as disks, tape drives, solid-state drives, read only memory (ROM), random access memory (RAM), flash memory, ternary content-addressable memory (TCAM), static random-access memory (SRAM), etc. The memory 1332 may be used as an over-flow data storage device, to store programs when such programs are selected for execution, and to store instructions and data that are read during program execution.

Figure 14:
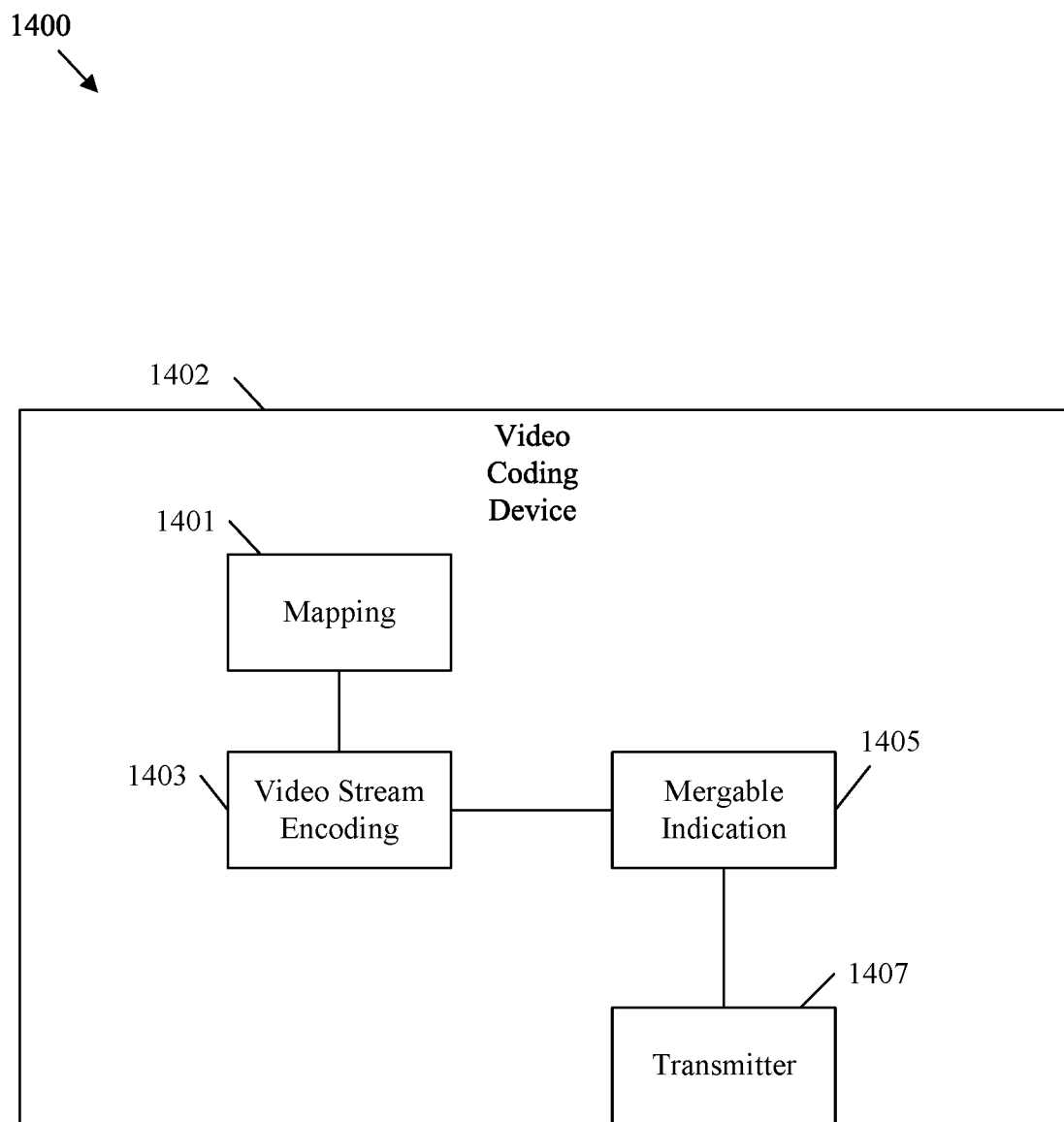
FIG. 14 is a schematic diagram of an example video coding device for bitstream level signaling to indicate that sub-picture bitstreams are mergable via a multi-bitstream merge function

FIG. 14 is a schematic diagram of an example video coding device for bitstream level signaling to indicate that sub-picture bitstreams are mergable via a multi-bitstream merge function. The video coding device 1400 implements the disclosed embodiments described above, such as coding module 1314, methods 200, 300, 1200, and/or combinations thereof. For example, the coding module 1314 of the video coding device 1400 can implement an encoder, such as encoder 103, codec system 400, and/or encoder 500, in order to encode the sub-picture video streams, such as sub-picture video streams 701 and 703, via viewport dependent coding. The video coding device 1400 may encode a sub-picture video stream in a bitstream 1100. Further, the video coding device 1400 may employ unidirectional inter-prediction 800, bidirectional inter-prediction 900, and/or mechanism 1000 in viewport dependent coding without creating visual artifacts due to sub-picture video stream boundaries.

The video coding device 1400 includes a mapping module 1401 for mapping a spherical video sequence, stitched from multiple directional video sequences, into a plurality of sub-picture video sequences each containing a sequence of sub-pictures. The video coding device 1400 also includes a video stream encoding module 1403 for encoding the plurality of sub-picture video sequences as sub-picture bitstreams to support merging of the plurality of sub-picture bitstreams, the encoding including ensuring that each sub-picture bitstream is self-referenced and two or more of the sub-picture bitstreams can be merged to generate a single video bitstream using a lightweight bitstream rewriting process that does not involve changing of any block-level coding results. The video coding device 1400 also includes a mergable indication module 1405 for encoding a mergable indication within at least one of the sub-picture bitstreams, the mergable indication indicating that the sub-picture bitstream containing the indication is compatible with a multi-bitstream merge function for reconstruction of the spherical video sequence or a part thereof. The video coding device 1400 also includes a transmitting module 1407 for transmitting a set of the sub-picture bitstreams and the mergable indication toward the decoder to support decoding and displaying a virtual reality video viewport.

Figure 15:
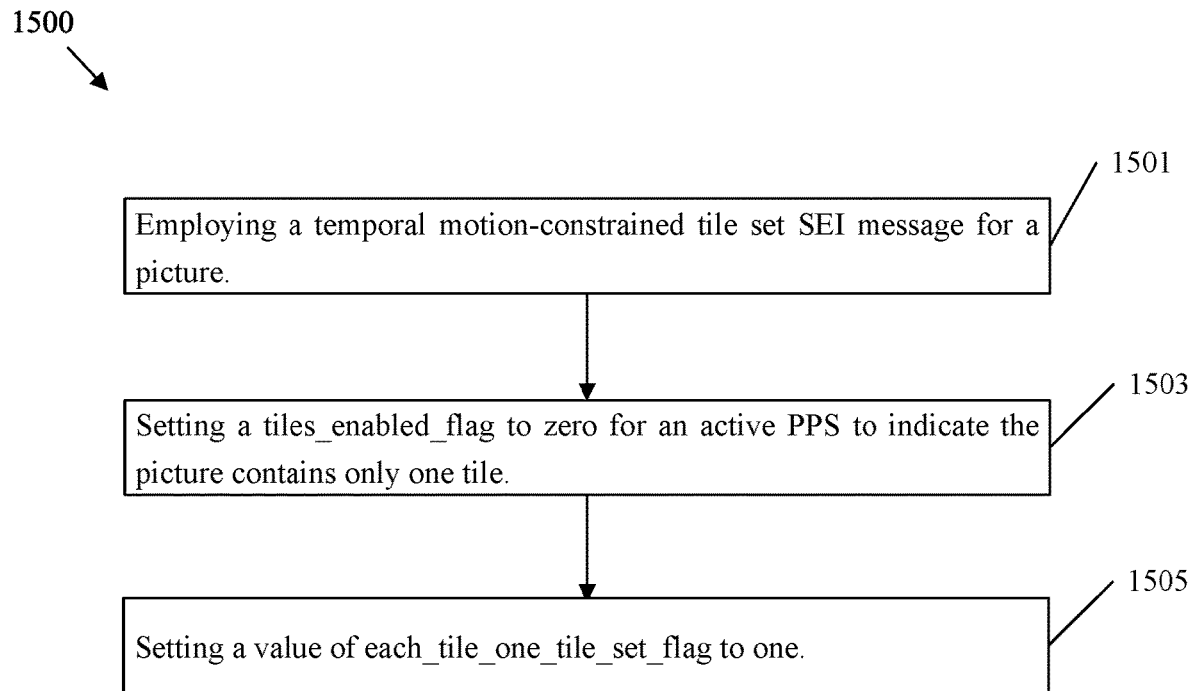
FIG. 15 is a flowchart of an example method of bitstream level signaling to indicate that sub-picture bitstreams are mergable via a multi-bitstream merge function.

FIG. 15 is a flowchart of an example method 1500 of bitstream level signaling to indicate that sub-picture bitstreams are mergable via a multi-bitstream merge function. At step 1501, a temporal motion-constrained tile set SEI message is employed for a picture. At step 1503, a tiles_enabled_flag is set to zero for an active PPS to indicate the picture contains only one tile. At step 1505, a value of each_tile_one_tile_set_flag is set to one. The each_tile_one_tile_set_flag in the temporal motion-constrained tile set SEI message is then used as the mergable indication.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method comprising:
employing, by a processor of an encoder, a temporal motion-constrained tile set (MCTS) supplemental enhancement information (SEI) message for a picture;
setting, by the processor, a tiles_enabled_flag to zero for an active picture parameter set (PPS) to indicate the picture employing the MCTS SEI message contains only one tile;
setting, by the processor, an entropy_coding_sync_enabled_flag to zero for the PPS when wavefront parallel processing (WPP) is not in use;
partitioning, by the processor, the picture into sub-pictures;
setting, by the processor, a same picture order count (POC) value for all sub-pictures partitioned from a same picture; and
setting, by the processor, a value of each_tile_one_tile_set_flag to one.

2. The method of claim 1, wherein the temporal MCTS SEI message is used despite inclusion of a single tile in a picture of a spherical video sequence.

3. The method of claim 1, further comprising storing, by a memory, the temporal MCTS SEI message, the PPS, and the each_tile_one_tile_set_flag as part of an encoded video bitstream.

4. The method of claim 1, further comprising encoding the picture into sub-picture bitstreams carried in tracks.

5. The method of claim 4, wherein encoding further comprises selecting motion vectors that reference fractional sample locations that employ only full sample locations inside a same sub-picture video signal for interpolation, and not selecting motion vectors that reference fractional sample locations that employ partial sample locations inside the same sub-picture video signal for interpolation.

6. The method of claim 4, wherein encoding further comprises selecting motion vectors that reference full sample locations in a same sub-picture video signal for interpolation, and not selecting motion vectors that reference full sample locations outside the same sub-picture video signal for interpolation.

7. A video coding device comprising:
a processor configured to:
employ a temporal motion-constrained tile set (MCTS) supplemental enhancement information (SEI) message for a picture;
set a tiles_enabled_flag to zero for an active picture parameter set (PPS) to indicate the picture employing the MCTS SEI message contains only one tile;
set an entropy_coding_sync_enabled_flag to zero for the PPS when wavefront parallel processing (WPP) is not in use;
partition the picture into sub-pictures;
set a same picture order count (POC) value for all sub-pictures partitioned from a same picture; and
set a value of each_tile_one_tile_set_flag to one.

8. The video coding device of claim 7, wherein the temporal MCTS SEI message is used despite inclusion of a single tile in a picture of a spherical video sequence.

9. The video coding device of claim 7, further comprising a memory coupled to the processor and configured to store the temporal MCTS SEI message, the PPS, and the each_tile_one_tile_set_flag as part of an encoded video bitstream.

10. The video coding device of claim 7, wherein the processor is further configured to encode the picture into sub-picture bitstreams carried in tracks.

11. The video coding device of claim 10, wherein encoding further comprises selecting motion vectors that reference fractional sample locations that employ only full sample locations inside a same sub-picture video signal for interpolation, and not selecting motion vectors that reference fractional sample locations that employ partial sample locations inside the same sub-picture video signal for interpolation.

12. The video coding device of claim 10, wherein encoding further comprises selecting motion vectors that reference full sample locations in a same sub-picture video signal for interpolation, and not selecting motion vectors that reference full sample locations outside the same sub-picture video signal for interpolation.

13. A non-transitory computer readable medium comprising a computer program product for use by a video coding device, the computer program product comprising computer executable instructions stored on the non-transitory computer readable medium such that when executed by a processor cause the video coding device to:
employ a temporal motion-constrained tile set (MCTS) supplemental enhancement information (SEI) message for a picture;
set a tiles_enabled_flag to zero for an active picture parameter set (PPS) to indicate the picture employing the MCTS SEI message contains only one tile;

set an entropy_coding_sync_enabled_flag to zero for the PPS when wavefront parallel processing (WPP) is not in use;
partition the picture into sub-pictures;
set a same picture order count (POC) value for all sub-pictures partitioned from a same picture; and
set a value of each_tile_one_tile_set_flag to one.

14. The non-transitory computer readable medium of claim 13, wherein the temporal MCTS SEI message is used despite inclusion of a single tile in a picture of a spherical video sequence.

15. The non-transitory computer readable medium of claim 13, wherein the computer executable instructions further cause the video coding device to store the temporal MCTS SEI message, the PPS, and the each_tile_one_tile_set_flag as part of an encoded video bitstream.

16. The non-transitory computer readable medium of claim 13, wherein the computer executable instructions further cause the video coding device to encode the picture into sub-picture bitstreams carried in tracks.

17. The non-transitory computer readable medium of claim 16, wherein encoding further comprises selecting motion vectors that reference fractional sample locations that employ only full sample locations inside a same sub-picture video signal for interpolation, and not selecting motion vectors that reference fractional sample locations that employ partial sample locations inside the same sub-picture video signal for interpolation.

18. The non-transitory computer readable medium of claim 16, wherein encoding further comprises selecting motion vectors that reference full sample locations in a same sub-picture video signal for interpolation, and not selecting motion vectors that reference full sample locations outside the same sub-picture video signal for interpolation.

* * * * *